United States Patent [19]

Kawase et al.

[11] Patent Number: 4,792,861

[45] Date of Patent: Dec. 20, 1988

[54] VIDEO SIGNAL RECORDING APPARATUS WITH TRACK CENTERING USING CROSSTALK DETECTION AND THIRD ODD MULTIPLE FIELD RECORDING

[75] Inventors: Shigeru Kawase, Tokyo; Hisao Kinjo, Yokohama; Yoshio Mizuno, Kamakura; Katsuyuki Shudo, Yokohama, all of Japan

[73] Assignee: Victor Company of Japan, Ltd., Kanagawa, Japan

[21] Appl. No.: 942,086

[22] Filed: Dec. 15, 1986

[30] Foreign Application Priority Data

Mar. 28, 1986 [JP] Japan .................................. 61-71560

[51] Int. Cl.[4] .......................... H04N 9/79; H04N 5/781
[52] U.S. Cl. ..................................... 358/313; 358/323; 358/335; 358/906; 358/909; 360/77.06; 360/78.15; 360/35.1
[58] Field of Search .................... 360/11.1, 33.1, 35.1, 360/36.1, 37.1, 77-78; 358/310, 313, 320-323, 335, 337-338, 342, 906, 909

[56] References Cited

U.S. PATENT DOCUMENTS

| | | | |
|---|---|---|---|
| 3,781,902 | 12/1973 | Shim et al. | 358/335 X |
| 3,893,180 | 7/1975 | Braun et al. | 360/77 |
| 3,919,697 | 11/1975 | Walker | 360/77 X |
| 4,237,500 | 12/1980 | Sanderson . | |
| 4,357,627 | 11/1982 | Johnson | 358/335 X |
| 4,553,175 | 11/1985 | Baumeister | 358/310 |
| 4,567,535 | 1/1986 | Kinjo | 358/906 X |
| 4,604,667 | 8/1986 | Kinjo | 358/906 X |
| 4,641,202 | 2/1987 | Nakamura et al. | 358/313 |
| 4,694,365 | 9/1987 | Kinjo | 358/906 X |

FOREIGN PATENT DOCUMENTS

| | | |
|---|---|---|
| 0105213 | 4/1984 | European Pat. Off. . |
| 2364784 | 7/1975 | Fed. Rep. of Germany . |
| 2460841 | 7/1975 | Fed. Rep. of Germany . |
| 53-33106 | 3/1978 | Japan . |
| 54-26621 | 2/1979 | Japan . |
| 2116352 | 9/1983 | United Kingdom . |

OTHER PUBLICATIONS

Patent Abstracts of Japan, unexamined applications, E section, vol. 3, No. 25, Feb. 28, 1979, p. 148 E 94.

Primary Examiner—Raymond F. Cardillo
Assistant Examiner—W. R. Young
Attorney, Agent, or Firm—Roberts, Spiecens & Cohen

[57] ABSTRACT

A video signal recording apparatus uses a crosstalk component reproduced from an adjacent pre-recorded track to control the position of a track which is newly formed when successively forming closed loop tracks on a rotary recording medium, and records a video signal amounting to one field on each track so that out of two mutually adjacent tracks making up a track pair, a signal related to an odd (or even) field out of signals which are related to two consecutive fields and constitute a picture is recorded on one track of the track pair and a signal related to an even (or odd) field out of signals which are related to two consecutive fields and constitute a picture is recorded on the other track of the track pair, so that signals amounting to one frame are recorded on the track pair.

23 Claims, 19 Drawing Sheets

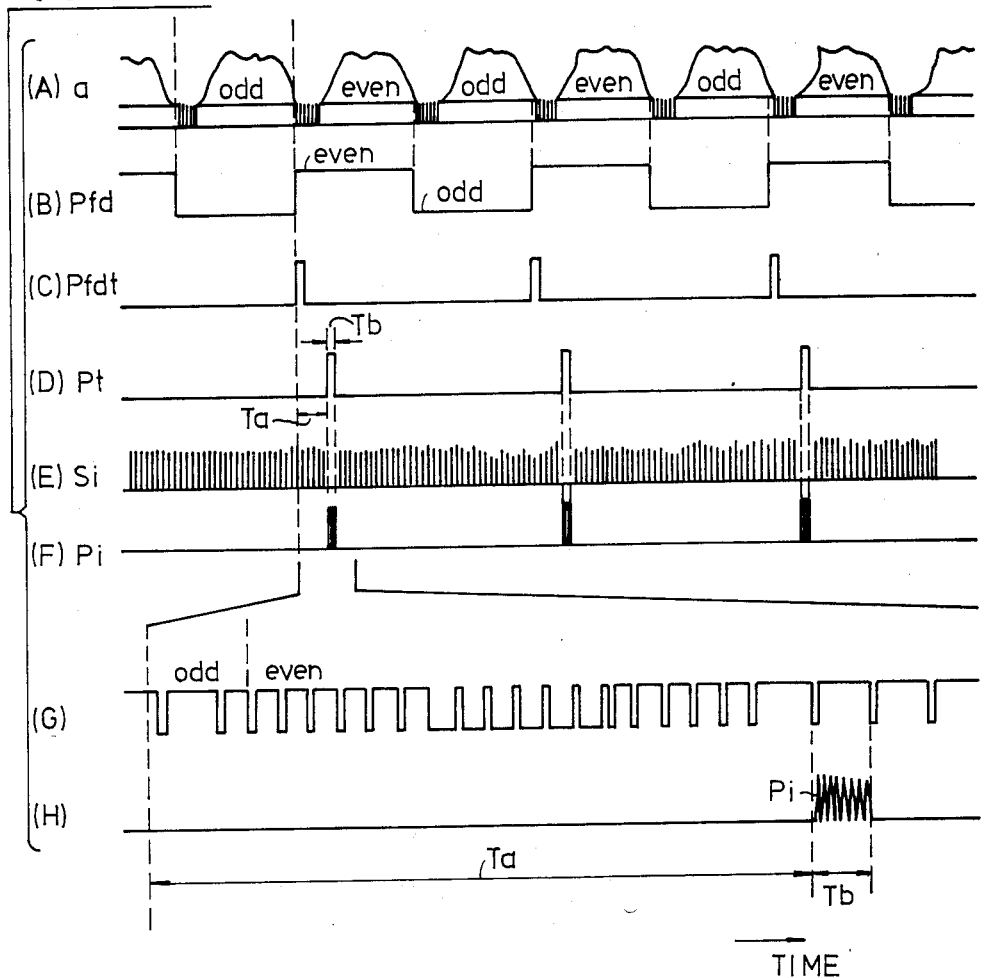

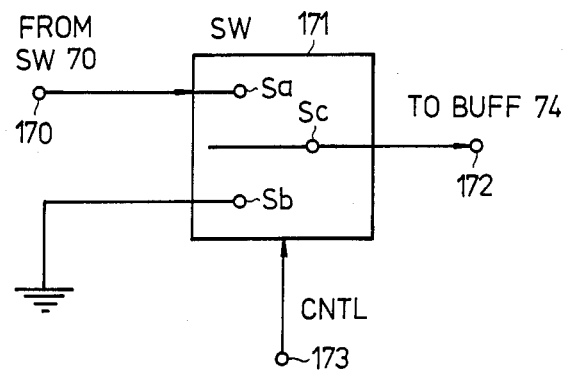
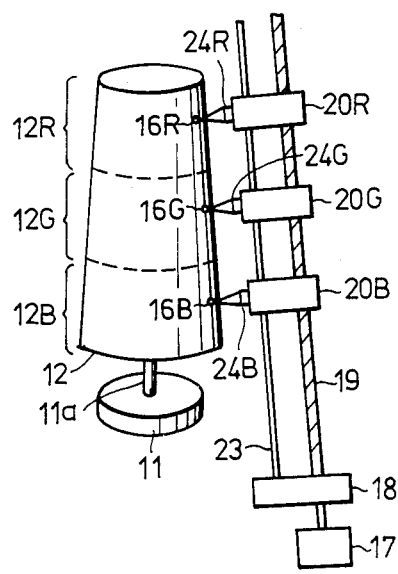

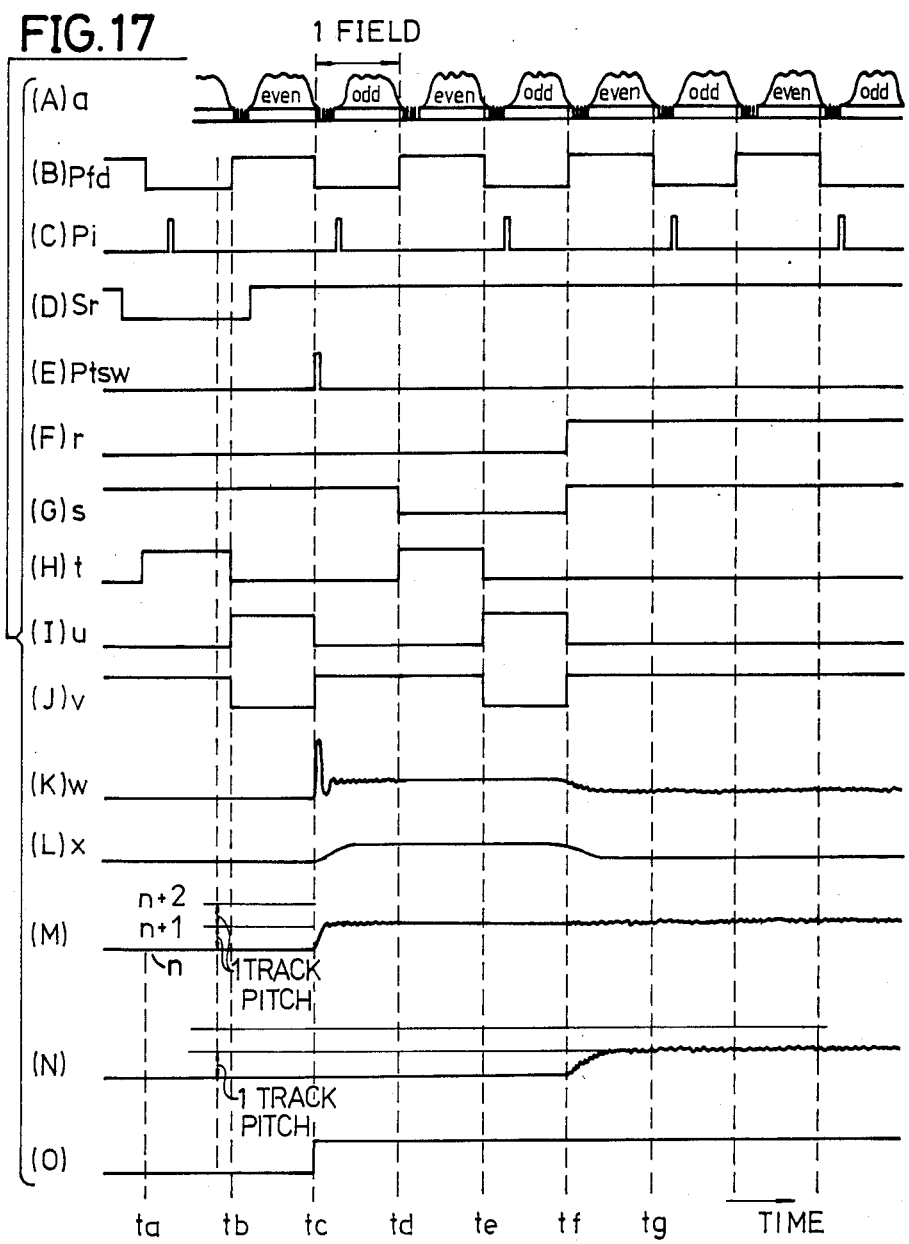

VIDEO SIGNAL RECORDING APPARATUS WITH TRACK CENTERING USING CROSSTALK DETECTION AND THIRD ODD MULTIPLE FIELD RECORDING

BACKGROUND OF THE INVENTION

The present invention generally relates to video signal recording apparatuses, and more particularly to a video signal recording apparatus which uses a crosstalk component reproduced from an adjacent pre-recorded track to control the position of a track which is newly formed when successively forming closed loop tracks on a rotary recording medium, and records a video signal amounting to one field on each track so that out of two mutually adjacent tracks making up a track pair, a signal related to an odd (or even) field out of signals which are related to two consecutive fields and constitute a picture is recorded on one track of the track pair and a signal related to an even (or odd) field out of signals which are related to two consecutive fields and constitute a picture is recorded on the other track of the track pair, so that signals amounting to one frame are recorded on the track pair.

When recording a composite video signal on a rotary recording medium, the composite video signal is generally recorded so that a signal amounting to an integral multiple of one field is recorded on one track which is formed for one revolution of the rotary recording medium. The track may either be a single continuous spiral track or a plurality of closed loop (concentric) tracks. It is possible to obtain a still picture by repeatedly reproducing the pre-recorded composite video signal from one track turn which is scanned in one revolution of the rotary recording medium.

Recently, the recording is carried out with a high recording density on such rotary recording mediums, and the track pitch has become extremely small, that is, in the order of a few microns. A tracking control is carried out at the time of the reproduction so that a reproducing element accurately scans over the tracks having such a small track pitch. According to the tracking control system which is generally employed, the tracking control is carried out by use of pre-recorded tracking reference signals which are reproduced from both sides of the track which is scanned by the reproducing element. However, in order to carry out the tracking control so that the reproducing element accurately scans over the intended track, the tracks must be formed with a constant track pitch at the time of the recording. In addition, when once discontinuing the recording and thereafter resuming the recording after a predetermined time, the tracks must also be formed with a constant track pitch.

When forming a plurality of independent closed loop tracks on the rotary recording medium, a recording element must be shifted intermittently by one track pitch in a direction approximately perpendicular to the track for every revolution of the rotary recording medium. A pulse motor (stepping motor), a rotary solenoid or a linear motor is used as a driving source for the recording element. When the pulse motor is used as the driving source, there are problems in that a large driving voltage is required, mechanical noise is generated during operation, a hunting phenomenon occurs when the recording element is shifted intermittently, and the cost is high. There are similar problems when the rotary solenoid or the linear motor is used as the driving source. Accordingly, these driving sources are unsuited for use as an intermittent driving source of an apparatus such as an electronic camera which needs to be light and compact.

In order to eliminate the problems of these conventional intermittent driving sources, a control system for an intermittent driving mechanism of the recording element was previously proposed in a Japanese Laid-Open Patent Application No. 58-173984 in which the applicant is the same as the assignee of the present application. The proposed control system comprises a rotational phase detector for detecting the rotational phase of a D.C. motor, a reduction gear mechanism for reducing the rotational speed of the D.C. motor, a converting mechanism for converting the rotary motion obtained from an output shaft of the reduction gear mechanism into a linear movement, and the like. When recording still picture information on each closed loop track of the rotary recording medium, the proposed control system shifts the recording element intermittently by one track pitch at a high speed by an intermittent shifting mechanism before and/or after the recording of each track. The stopping position of the recording element is restricted by use of a signal which indicates the rotational phase of the D.C. motor. But since the control which is carried out in this proposed control system is essentially an open loop control, it is difficult to form the tracks with a constant track pitch. This is because the recording conditions such as the time and temperature are different for each still picture which is recorded on each track, and changes such as contraction and expansion take place on a substrate or base of the rotary recording medium and on the mechanisms of the recording apparatus.

On the other hand, in the case where the composite video signal which is to be recorded uses the horizontal and vertical scan in conformance with the 2:1 interlaced scanning, there is a conventional recording apparatus which records a picture on each closed loop track by setting the rotation period of the rotary recording medium to one frame of the composite video signal and recording a signal amounting to one frame on each track. In this case, it is possible to reproduce a complete picture at the time of the reproduction by carrying out an interlaced scanning, and the picture quality of the reproduced picture is satisfactory. However, when there is a large change in the picture information between the two fields which constitute one track, a large blur is generated in the reproduced picture. In addition, because a signal amounting to one frame is recorded on each track, the diameter of the rotary recording medium must be made large in order to obtain a large relative linear velocity between the rotary recording medium and the recording element. But there is a problem in that the overall size of the recording apparatus becomes large when the rotary recording medium has a large diameter.

There is also a conventional recording apparatus which records a picture on each closed loop track by setting the rotation period of the rotary recording medium to one field of the composite video signal and recording a signal amounting to one field on each track. In this case, a blur will not be generated in the reproduced picture even when there is a large change in the picture information between two successive fields because the signal amounting to only one field is recorded on each track. Furthermore, it is unnecessary to make the diameter of the rotary recording medium large in order to obtain a large relative linear velocity between the rotary recording medium and the recording element, and it is possible to downsize the recording apparatus with ease. However, since the picture information recorded on each track is essentially one-half the picture information recorded on each track having the signal amounting to one frame recorded thereon, there is a problem in that the picture quality of the reproduced picture is unsatisfactory.

Hence, it is possible to conceive a method of recording the composite video signal, wherein the rotation period of the rotary recording medium is set to one field of the composite video signal and a signal amounting to one frame is recorded on two mutually adjacent closed loop tracks which make up a track pair. According to this conceivable method, it is possible to reproduce a still picture in terms of one field or in terms of one frame depending on the needs, and it was thought that this conceivable method would eliminate the majority of the problems of the conventional recording apparatuses described before. However, in order to record on the two mutually adjacent closed loop tracks the signals related to two consecutive fields on the time base, the signal related to the first field must first be recorded on one track of the track pair and the recording element must thereafter be instantaneously shifted by one track pitch within a vertical blanking period of the composite video signal to the track position of the other track of the track pair so as to record the signal related to the second field on this other track. But when the recording element is shifted instantaneously, it takes a predetermined setting time until the recording element becomes correctly positioned on the intended track. For this reason, it is difficult to satisfactorily record the signals related to the two consecutive fields without loss of information on the two mutually adjacent tracks.

SUMMARY OF THE INVENTION

Accordingly, it is a general object of the present invention to provide a novel and useful video signal recording apparatus in which the problems described heretofore are eliminated.

Another and more specific object of the present invention is to provide a video signal recording apparatus which uses a crosstalk component reproduced from an adjacent pre-recorded track to control the position of a track which is newly formed when successively forming closed loop tracks on a rotary recording medium, and records a video signal amounting to one field on each track so that out of two mutually adjacent tracks making up a track pair, a signal related to an odd (or even) field out of signals which are related to two consecutive fields and constitute a picture is recorded on one track of the track pair and a signal related to an even (or odd) field out of signals which are related to two consecutive fields and constitute a picture is recorded on the other track of the track pair, so that signals amounting to one frame are recorded on the track pair. According to the recording apparatus of the present invention, it is possible to obtain a still picture in terms of one frame or one field depending on the needs, and hence obtain a reproduced picture free of blur. In addition, it is possible to downsize the recording apparatus with ease because it is unnecessary to make the diameter of the rotary recordign medium large in order to make the relative linear velocity between the rotary recording medium and a scanning element large. Further, when obtaining a still picture in terms of one frame, it is possible to obtain a reproduced picture having a satisfactory picture quality because the picture information amounting to one frame is reproduced. Moreover, since the signals recorded on the track pair are related to two fields which are strictly speaking discontinuous on the time base, it is unnecessary to instantaneously shift the scanning element from one track to the other, and a predetermined setting time required for the scanning element to be correctly positioned on the intended track does not cause problems. Accordingly, it is possible to record the signals amounting to two fields without loss of information on the two mutually adjacent tracks which make up the track pair.

Still another object of the present invention is to provide a video signal recording apparatus in which the scanning element has the functions of recording, reproducing and erasing signals. When forming a new track on the rotary recording medium, the scanning element is in a reproducing state for at least the first one field so as to control the track position of the new track by use of the crosstalk component which is reproduced from the adjacent pre-recorded track, is thereafter in an erasing state for at least one field to erase pre-recorded signals on the new track, and is thereafter in a recording state for at least one field to recording a signal amounting to one field on the new track. The scanning element is shifted by one track pitch to the track position of a next new track which is to be formed after the recording on the new track is completed.

Other objects and further features of the present invention will be apparent from the following detailed description when read in conjunction with the accompanying drawings.

BRIEF DESCRIPTION OF THE DRAWINGS

FIGS. 15(A) through 15(H) are timing charts for explaining the operation of the field discriminating signal generating circuit;

FIG. 16 is a system block diagram showing an essential part of a modification of the video signal recording apparatus according to the present invention;

FIGS. 17(A) through 17(O) are timing charts for explaining the operation of the block system shown in FIG. 17;

FIG. 18 is a diagram showing an essential part of a second embodiment of the video signal recording apparatus according to the present invention;

DETAILED DESCRIPTION

Figure 1:
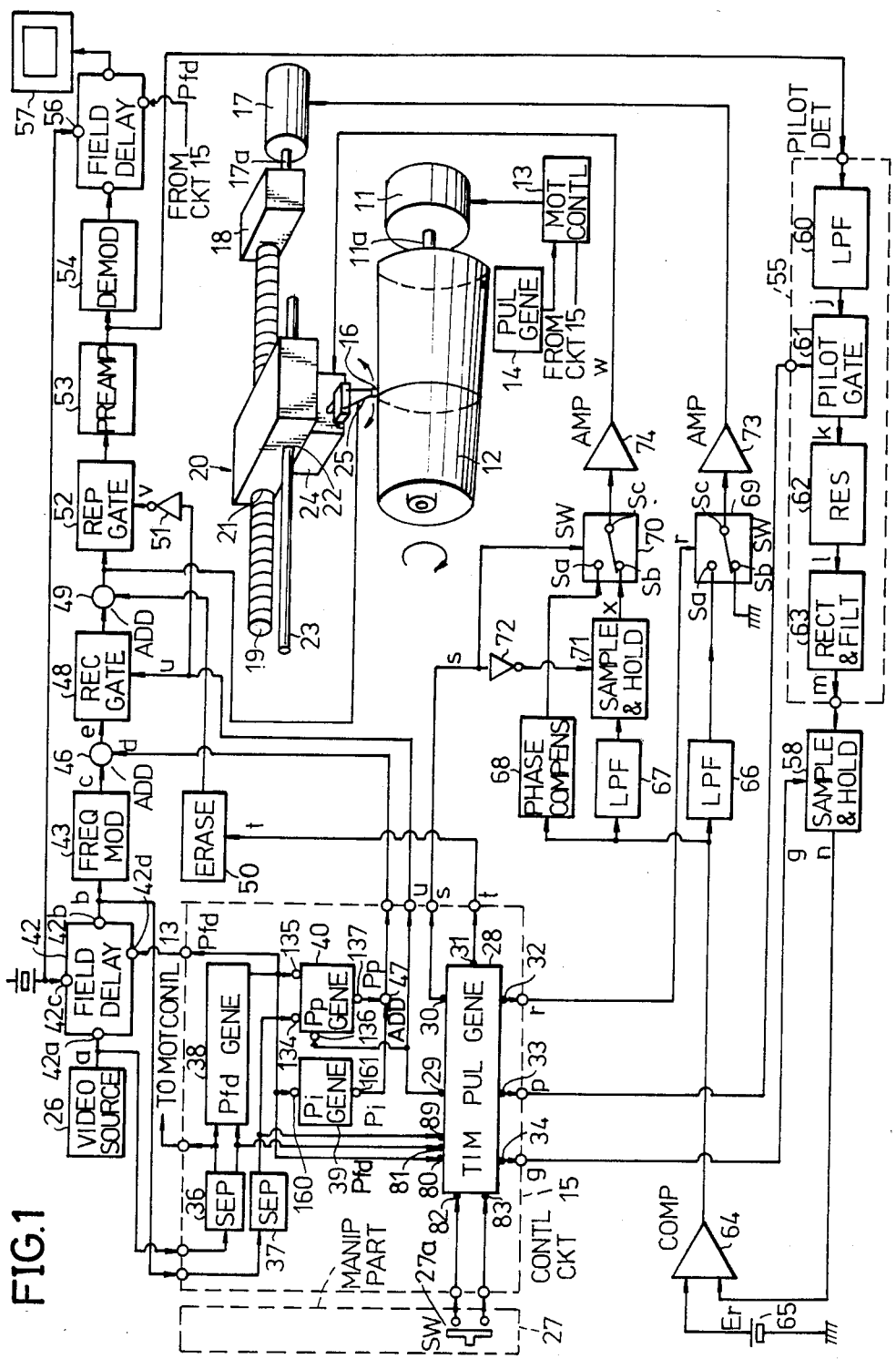
FIG. 1 is a system block diagram showing a first embodiment of the video signal recording apparatus according to the present invention.

FIG. 1 shows a first embodiment of the video signal recording apparatus according to the present invention applied to the case where a cylindrical magnetic recording medium is used as the rotary recording medium. A cylindrical recording medium (hereinafter simply referred to as a recording medium) 12 is rotated by a motor 11, and the motor 11 is automatically controlled so that the rotation period of the recording medium 12 becomes equal to a vertical scanning period of a composite video signal which is to be recorded. A motor control circuit 13 is supplied with output pulses of a pulse generator 14 and vertical synchronizing pulses obtained from a control circuit 15 which will be described later. The pulse generator 14 has a known construction and generates pulses dependent on a reference rotational phase of the recording medium 12 which is rotated via a rotary shaft 11a of the motor 11. The motor control circuit 13 compares the phases of the two kinds of pulses supplied thereto, and produces a phase error signal for automatically controlling the motor 11 so as to rotate the recording medium 12 with such a rotation frequency and phase that the composite video signal amounting to one vertical scanning period (one field) can be recorded with the correct phase in one revolution of the recording medium 12.

Accordingly, when the vertical scanning period of the composite video signal which is to be recorded is 1/60 second as in the case of the television standard employed in the United States, the recording medium 12 is rotated at a speed of 3600 rpm so that one field of the composite video signal can be recorded in one revolution of the recording medium 12. On the other hand, when the vertical scanning period of the composite video signal which is to be recorded is 1/50 second as in the case of the television standard employed in most European countries, the recording medium 12 is rotated at a speed of 3000 rpm so that one field of the composite video signal can be recorded in one revolution of the recording medium 12. The rotational phase of the recording medium 12 is controlled so that reference positions of the rotational phase lie on a specific generating line (a specific radial line in the case where the recording medium is a disc).

A magnetic head 16 which is used to record signals on the recording medium 12 is intermittently fed at the time of the recording, and closed loop tracks (or ring shaped tracks) are formed on the recording medium 12 with a predetermined track pitch.

A motor such as a D.C. motor which can be controlled to rotate in both forward and reverse directions is used for a feed motor 17. A rotary shaft 17a of the feed motor 17 is coupled to an input shaft of a reduction gear mechanism 18, and a feed screw 19 is coupled to an output shaft of the reduction gear mechanism 18. Hence, the rotational speed of the feed motor 17 is reduced by the reduction gear mechanism 18 and the feed screw 19 rotates at the reduced rotational speed. The feed screw 19 is screwed into a threaded hole 21 provided in a carriage 20, and a guide rod 23 penetrates a hole 22 in the carriage 20. When the feed motor 17 rotates, the carriage 20 is fed by the feed screw 19 under guidance of the guide rod 23. An actuator 24 is fixed to the carriage 20, and a cantilever 25 having the head 16 on a tip end thereof is coupled to the actuator 24. The feed motor 17 is intermittently driven under the control of the control circuit 15, and the head 16 is intermittently fed on the recording medium 12 with the predetermined track pitch.

In FIG. 1, a plurality of switches for instructing various operations of the recording apparatus such as the recording and reproducing operations are provided in a manipulation part 27. The control circuit 15 outputs via terminals 29 through 34 timing pulses which have predetermined timings and are generated in a timing pulse generating circuit 28 responsive to the manipulation of a switch in the manipulation part 27, and the pulses from the terminals 29 through 34 are supplied to various parts of the recording apparatus to control operations thereof.

For convenience' sake, only a switch 27a for instructing the recording is shown within the manipulation part 27 in FIG. 1.

A composite video signal generating source 26 which generates the composite video signal which is to be recorded may take any form. For example, in the case where the recording apparatus is a compact electronic camera, the generating source 26 may be constituted by a color video signal generator using solid state image sensor. For example, the composite video signal from the generating source 26 may be a composite video signal including a frequency modulated luminance signal and a carrier chrominance signal which has been frequency converted into a frequency band lower than a frequency band of the frequency modulated luminance signal.

The composite video signal from the generating source 26 is used as a reference for the operation of the recording apparatus and is supplied to the control circuit 15. The control circuit 15 comprises in addition to the timing pulse generating circuit 28 a separating circuit 36 for separating vertical and horizontal synchronizing signals from the composite video signal, a separating circuit 37 for separating the horizontal synchronizing signal from the composite video signal, a field discriminating signal generating circuit 38 for generating a field discriminating signal Pfd for discriminating whether the field is an odd field or an even field, a field index signal generator 39 for generating a field index signal Pi for discriminating whether the signal relates to an odd field or an even field, and a pilot signal generating circuit 40 for generating a pilot signal Pp.

In the recording mode, the pilot signal Pp which is reproduced as crosstalk from a pre-recorded track adjacent to a new track which is being formed is used to control the track position of the new track. During the reproduction mode, the pilot signal Pp which is reproduced as crosstalk from a pre-recorded track adjacent to a pre-recorded track which is being scanned is used as a tracking reference signal for carrying out a tracking control. The pilot signal Pp has such a low frequency that the head 16 can satisfactorily reproduce the pilot signal from the track which is being scanned and from the track which is adjacent thereto. The pilot signal Pp may be inserted in a burst form within a horizontal blanking period the composite video signal, or may be recorded as a continuous signal by frequency multiplexing with the composite video signal.

In the embodiment, it will be assumed that the pilot signal Pp is inserted in the burst form within the horizontal blanking periods of the composite video signal with an interval of three horizontal scanning periods. However, in the case where the pilot signal Pp is recorded as the continuous signal by frequency multiplexing with the composite video signal, two or more kinds of signals which can be distinguished from one another may be recorded by turns on the successive tracks, for example.

Figure 2A:
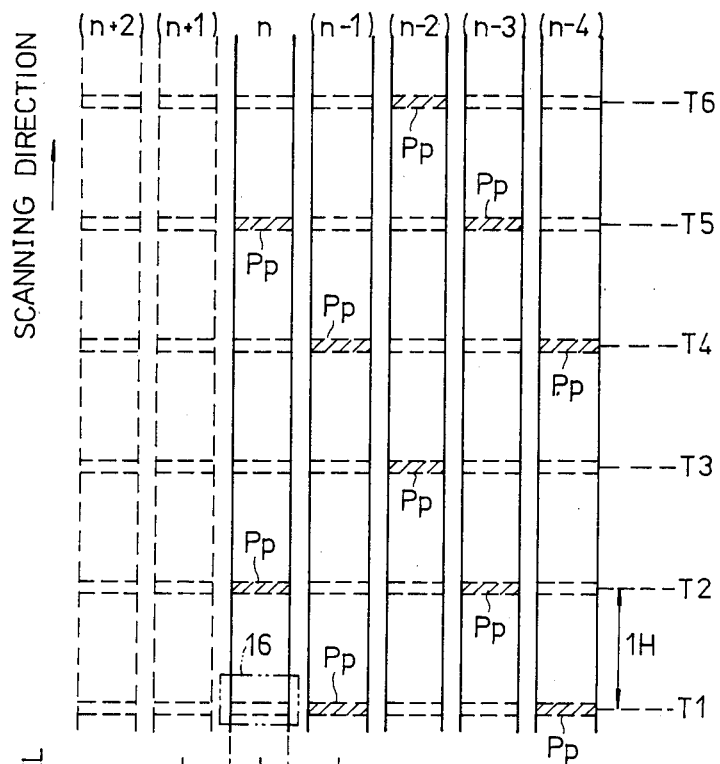
FIG. 2A shows a track pattern which is formed on a rotary recording medium by the recording apparatus shown in FIG. 1.
Figure 2B:
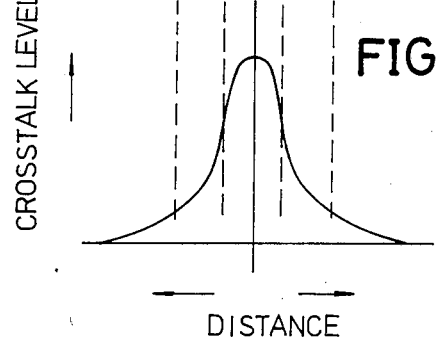
FIG. 2B is a graph showing the level of a crosstalk component reproduced from an adjacent track with repsect to the distance from the adjacent track in correspondence with the track pattern shown in FIG. 2A.

FIG. 2A shows a track pattern which is formed on the recording medium 12 by the recording apparatus, where the tracks are successively formed with a predetermined track pitch in the order of 10 microns and the pilot signal Pp is recorded with an interval of three horizontal scanning periods as indicated by hatchings. FIG. 2B shows in correspondence with the track pattern shown in FIG. 2A the relationship between the scanning position of the head 16 and the crosstalk level of the pilot signal Pp recorded on the nth track for the case where the head 16 is scanning a position in the vicinity of the nth track and the pilot signal Pp recorded on the nth track has a low frequency in the order of 500 kHz, for example.

The composite video signal from the generating source 26 is applied to an input terminal 42a of a field delay circuit 42. The field delay circuit 42 delays the composite video signal during preselected fields so that the time position of the horizontal scanning period of the signal related to the preselected field is shifted by one-half the horizontal scanning period with respect to the time position of the original signal. An output composite video signal of the field delay circuit 42 from an output terminal 42b is supplied to a frequency modulator 43 and to the separating circuit 37 within the control circuit 15.

When the composite video signal which is to be recorded uses the horizontal and vertical scan in conformance with the 2:1 interlaced scanning, there is a known circuit for delaying the time position of the horizontal scanning period of the signal related to a preselected one of the two consecutive fields on the time base so that the time position becomes delayed by one-half the horizontal scanning period with respect to the time position of horizontal scanning period of the signal related to the other of the two consecutive fields. Such a known circuit may be used for the field delay circuit 42 and also for a field delay circuit 56 which will be described later.

Figure 3:
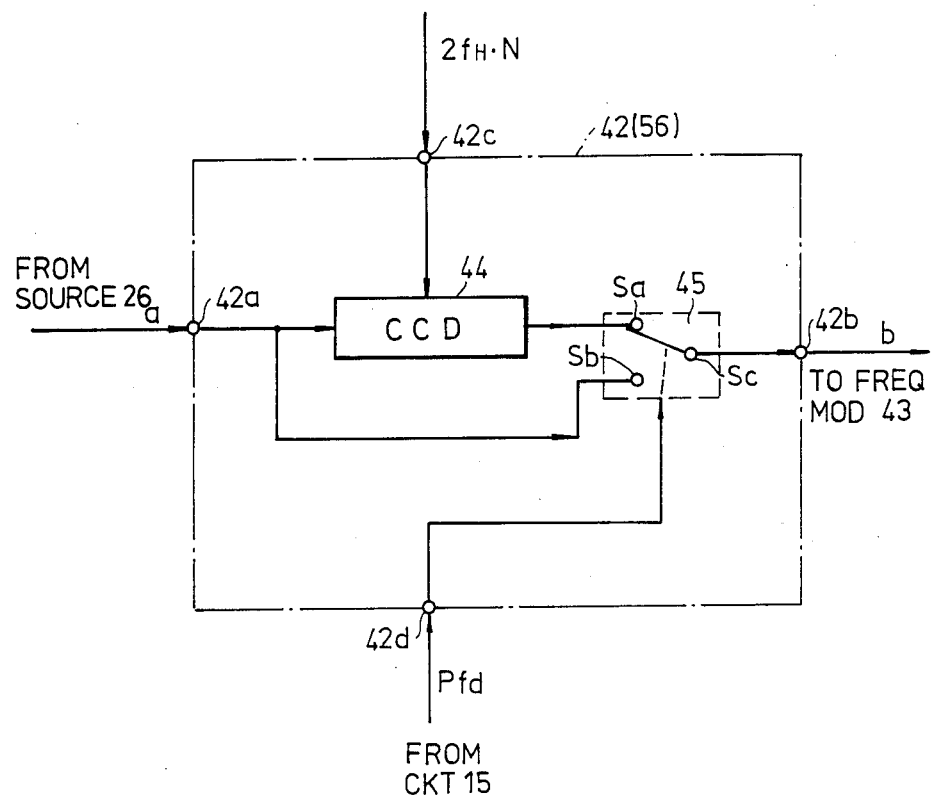
FIG. 3 is a system circuit diagram showing an embodiment of a field delay circuit within the block system shown in FIG. 1.
Figure 5:
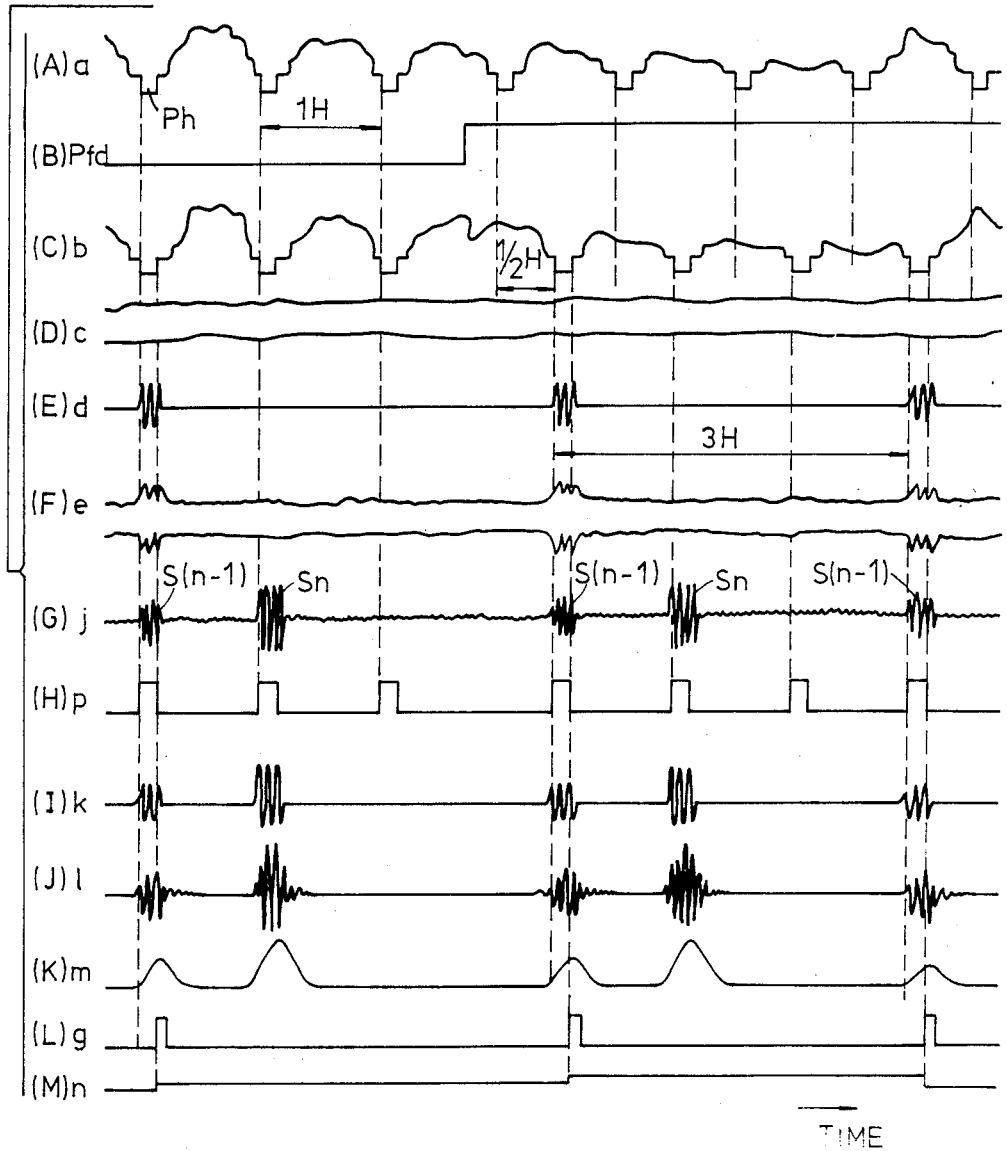
FIGS. 5(A) through 5(M) and FIGS. 6(A) through 6(V) are timing charts for explaining the operation of the block system shown in FIG. 1.

The field delay circuits 42 and 56 may respectively have a construction shown in FIG. 3. In FIG. 3, the field delay circuit 42 (or 56) comprises a charge coupled device (CCD) 44 and a switch 45. The composite video signal applied to the input terminal 42a is supplied to the CCD 44 comprising N stages and to a fixed contact Sb of the switch 45. Clock pulses having a repetition frequency which is 2N times the horizontal scanning frequency $f_h$ of the composite video signal are applied to an input terminal 42c of the field delay circuit 42 from a crystal oscillator (shown in FIG. 1), for example, and are supplied to the CCD 44. Hence, the composite video signal supplied to a fixed contact Sa of the switch 45 is delayed by one-half the horizontal scanning period of the composite video signal compared to the composite video signal supplied to the contact Sb of the switch 45. A moving contact Sc of the switch 45 makes contact with the contact Sa during an even field and makes contact with the contact Sb during an odd field responsive to the field discriminating signal Pfd shown in FIG. 5(B) which is obtained from the control circuit 15 via an input terminal 42d. This field discriminating signal Pfd has a low level during the odd field and has a high level during the even field. The connection of the switch 45 is switched with a predetermined timing at a time position immediately before the field changes from an odd field to an even field and at a time position immediately before the field changes from an even field to an odd field.

Out of a composite video signal a shown in FIGS. 4(A) and 5(A) which is supplied to the input terminal 42a of the field delay circuit 42, the signal related to the odd field is supplied to an output terminal 42b via the contacts Sb and Sc of the switch 45. On the other hand, out of the composite video signal a, the signal related to the even field is supplied to the output terminal 42b via the CCD 44 and the contacts Sa and Sc of the switch 45. Hence, when a composite video signal b shown in FIG. 5(C) which is continuous on the time base and is outputted via the output terminal 42b of the field delay circuit 42 is recorded on the recording medium 12, the recorded positions of the horizontal synchronizing signals on the tracks become aligned in the direction of the width of the tracks as may be seen from the track patterns shown FIGS. 4(I) and 4(J). In FIG. 4(J), the recorded positions of the pilot signal Pp is indicated by hatchings.

FIGS. 4(B) and 4(C) respectively show the changing portions of the composite video signal a shown in FIG. 4(A) where the field changes from the even field to the odd field and changes from the odd field to the even field, with the time base expanded compared to FIG. 4(A). FIGS. 4(E) and 4(F) show the field discriminating signal Pfd in correspondence with FIGS. 4(B) and 4(C), and FIGS. 4(G) and 4(H) respectively show the delayed composite video signal which has been delayed in the CCD within the field delay circuit 42 in correspondence with the composite video signal shown in FIGS. 4(B) and 4(C). FIG. 4(K) shows pilot signal portion in correspondence with the track pattern shown in FIG. 4(J), with the time base expanded compared to FIG. 4(J). In FIGS. 4(B), 4(C), 4(G) and 4(H), two waveforms are shown in parallel, and the lower waveform shows the horizontal synchronizing signals portion.

FIG. 4(J) shows the track pattern which is formed on the recording medium 12 when the pilot signal Pp is inserted into the horizontal blanking periods of the composite video signal b from the field delay circuit 42 with an interval of three horizontal scanning periods. FIG. 4(D) shows for comparison purposes a track pattern which is formed on the recording medium 12 if the composite video signal a such as that shown in FIGS. 4(B) and 4(C) and supplied to the field delay circuit 42 were recorded directly on the recording medium 12, without being passed through the field delay circuit 42. As may be seen from FIG. 4(D), the recorded positions of the horizontal synchronizing signals do not become aligned in the direction of the width of the tracks in this case.

The composite video signal b from the field delay circuit 42 is frequency-modulated into a frequency modulated signal c shown in FIG. 5(D) in the frequency modulator 43. A field index signal Pi shown in FIG. 6(C) which is generated in the field index signal generating circuit 39 within the control circuit 15 and the pilot signal Pp generated in the pilot signal generating circuit 40 are added in an adder 47 within the control circuit 15, and an added signal d shown in FIG. 5(E) is produced from the adder 47. An adder 46 adds the frequency modulated signal c and the added signal d and produces a signal e shown in FIG. 5(F). Since the added signal d occupies a frequency band lower than a frequency band occupied by the frequency modulated signal c, it is possible to separate the two signals c and d with ease at the time of the reproduction.

The signal e from the adder 46 is supplied to a recording signal gating circuit 48. The gate circuit 48 passes the signal e and supplies this signal e to the head 16 via an adder 49 during one field in which a gating signal u shown in FIG. 6(Q) has a high level. The gating signal u is generated in the timing pulse generating circuit 28 within the control circuit 15 and is obtained via the terminal 29. The head 16 records the signal e on one closed loop track of the recording medium 12.

The adder 49 is supplied with an erasing signal (current) from an erasing circuit 50. This erasing signal is generated in the erasing circuit during one field in which a signal t shown in FIG. 6(P) which is generated in the timing pulse generating circuit 28 and is obtained via the terminal 31 has a high level. The signal t has a high level during one field which occurs before the one field in which the level of the gating signal e becomes high and the signal e is recorded on one track of the recording medium 12. The gating signal u is supplied to a reproduced signal gating circuit 52 via an inverter 51. Hence, the open and closed timings of the gating circuits 48 and 52 are opposite to each other. A gating signal v shown in FIG. 6(R) is supplied to the gating circuit 52.

When the gating circuit 52 is open, a signal reproduced from the recording medium 12 by the head 16 is passed through the gating circuit 52 and is supplied to a preamplifier 53. The reproduced signal from the preamplifier 53 is supplied to a demodulator 54 and to a pilot signal detecting circuit 55. The demodulator 54 frequency-demodulates the reproduced signal and supplies a demodulated signal to the field delay circuit 56 described before. The field delay circuit 56 carries out a predetermined signal processing and supplies an output signal to a monitoring receiver 57. The monitoring receiver 57 obtains a reproduced picture from the reproduced signal.

On the other hand, the pilot signal detecting circuit 55 extracts the pilot signal Pp from the output reproduced signal of the preamplifier 53 for use as a control signal for controlling the recording track position on the recording medium 12. The pilot signal detecting circuit 55 comprises a lowpass filter 60, a pilot gating circuit 61, a resonant circuit 62, and a rectifying and filtering circuit 63. A D.C. signal m shown in FIG. 5(K) corresponding to the extracted pilot signal Pp is generated from the pilot signal detecting circuit 55 and is supplied to a sample and hold circuit 58. The reproduced signal which is obtained from the head 16 includes the signal reproduced from the intended track which is scanned by the head 16 and a crosstalk component reproduced from the track which is adjacent to the intended track. In other words, the reproduced signal from the head 16 includes the signal e which is a frequency multiplexed signal of the frequency modulated signal c and the added signal d and is reproduced from the intended track, and the pilot signal Pp which is reproduced as crosstalk from the track adjacent to the intended track. Hence, the lowpass filter 60 eliminates the frequency modulated signal c which occupies the high frequency band in the reproduced signal. As a result, a signal j shown in FIG. 5(G) including the pilot signal reproduced from the intended track and the pilot signal reproduced as crosstalk from the track adjacent to the intended track is obtained from the lowpass filter 60. The D.C. signal m outputted from the pilot signal detecting circuit 55 is in correspondence with this signal j.

As described above, the signal j shown in FIG. 6(G) is the low frequency component of the reproduced signal supplied to the lowpass filter 60. When it is assumed that the (n−4)th, (n−3)th, (n−2)th and (n−1)th tracks shown in FIG. 2A are pre-formed (pre-recorded) on the recording medium 12, the head 16 is presently scanning the intended nth track, the subsequent (n+1)th and (n+2)th tracks are not yet formed, and the pilot signal Pp is inserted into the horizontal blanking periods with an interval of three horizontal scanning periods as described before on the pre-formed tracks, a signal portion S(n−1) of the signal j is the pilot signal Pp which is reproduced as crosstalk from the (n−1)th track which is adjacent to the intended nth track which is scanned by the head 16, and a signal portion Sn is the pilot signal Pp which is reproduced from the intended nth track.

The output signal j of the lowpass filter 60 is supplied to the pilot gating circuit 61 which is supplied with a gating signal p shown in FIG. 5(H). The gating signal p is generated in the timing pulse genterating circuit 28 within the control circuit 15 and is supplied to the pilot gating circuit 61 via the terminal 33. Hence, a reproduced pilot signal k shown in FIG. 5(I) is obtained from the pilot gating circuit 61 and is supplied to the resonant circuit 62.

The resonant circuit 62 produces a signal l shown in FIG. 5(J). The signal l is supplied to the rectifying and filtering circuit 63 which rectifies and filters the signal l into the D.C. signal m shown in FIG. 5(K). The D.C. signal m is supplied to the sample and hold circuit 58 as described before.

FIG. 5(L) shows a sampling pulse signal g which is generated in the timing pulse generating circuit 28 within the control circuit 15 and is supplied to the sample and hold circuit 58 via the terminal 34. The sampling pulse signal g has such a timing that it is possible to obtain from the sample and hold circuit 58 only a portion of the D.C. signal m corresponding to the pilot signal Pp which is reproduced as crosstalk from the track adjacent to the intended track which is scanned.

When the head 16 is scanning a position in a vicinity of the intended n-th track in FIG. 2A, the reproduced signal from the head 16 includes the pilot signal portion Sn reproduced from the intended nth track and the pilot signal portion S(n−1) reproduced from the adjacent (n−1)th track. But as described before, when the head is scanning the position in the vicinity of the intended nth track, the pilot signal which is actually used as the control signal for controlling the track position on the recording medium 12 is the pilot signal reproduced as crosstalk from the adjacent (n−1)th track, that is, only the pilot signal portion S(n−1). Hence, in this case where the head 16 is scanning the position in the vicinity of the intended nth track, the pilot signal portion S(n−1) which is used for controlling the track position is reproduced by the head 16 at times T1, T4, . . . in FIG. 2A.

In this case where the head 16 is scanning the position in the vicinity of the intended nth track, the sampling pulse signal g supplied to the sample and hold circuit 58 from the timing pulse generating circuit 28 must have such a timing that the sample and hold circuit 58 can perform the sample and hold operation at the times T1, T4, . . . in FIG. 2A. In addition, when the head 16 is at a position in a vicinity of the (n−3)th track, (n−6)th track (not shown) and the like, the sampling pulse signal g generated in the timing pulse generating circuit 28 must have such a timing that the sample and hold operation of the sample and hold circuit 58 is performed at the times T1, T4, . . . .

Next, when the head 16 is at a position in a vicinity of the (n−1)th track, (n−4)th track, (n−7)th track (not shown), (n+2)th track, (n+5)th track (not shown) and the like in FIG. 2A, the sampling pulse signal g generated in the timing pulse generating circuit 28 must have such a timing that the sample and hold operation of the sample and hold circuit 58 is performed at the times T3, T6, . . . . Similarly, when the head 16 is at a position in a vicinity of the (n−2)th track, (n−5)th track (not shown), (n+1)th track, (n+4)th track (not shown) and the like in FIG. 2A, the sampling pulse signal g generated in the timing pulse generating circuit 28 must have such a timing that the sample and hold operation of the sample and hold circuit 58 is performed at the times T2, T5, . . . .

By supplying to the sample and hold circuit 58 the sampling pulse signal g having the appropriate timing described above, it is possible to obtain a signal n shown in FIG. 5(M) from the sample and hold circuit 58. This signal n is supplied to a comparator 64 as a signal which is subjected to a comparison with a reference signal. A displacement reference voltage Er from a reference voltage source 65 is supplied to the comparator 64 as the reference signal.

The magnitude of the displacement reference voltage Er is determined as follows. When it is assumed that the pilot signal Pp (control signal for the track position control) is recorded on the pre-formed (n−1)th, (n−2)th, (n−3)th and (n−4)th tracks shown in FIG. 2A which are formed with a regular predetermined track pitch, the pilot signal portion S(n−1) which is reproduced as crosstalk from the adjacent (n−1)th track is used to control the track position of the intended nth track which is being formed, so that the distance between the (n−1)th track and the nth track is equal to the regular predetermined track pitch. This pilot signal portion S(n−1) is supplied to the comparator 64 via the pilot signal detecting circuit 55 and the sample and hold circuit 58. The reference voltage Er is determined so that the voltage (signal n) supplied to the comparator 64 from the sample and hold circuit 58 becomes equal to the reference voltage Er supplied to the comparator 64 from the reference voltage source 65.

The comparator 64 produces an error signal dependent on a difference between the output voltage n (pilot or control signal for track position control) of the sample and hold circuit 58 and the reference voltage Er from the reference voltage source 65. The output error signal of the comparator 64 is supplied to lowpass filters 66 and 67 and to a phase compensation circuit 68. An output signal of the lowpass filter 66 is supplied to a fixed contact Sa of a switch 69. An output signal of the phase compensation circuit 69 is supplied to a fixed contact Sa of a switch 70. An output signal of the lowpass filter 67 is supplied to a sample and hold circuit 71. An output signal x shown in FIG. 6(T) of the sample and hold circuit 71 is supplied to a fixed contact Sb of the switch 70.

A moving contact Sc of the switch 69 is connected to the contact Sa during a high level period of a switching control signal r shown in FIG. 6(N) which is generated in the timing pulse generating circuit 28 within the control circuit 15 and is obtained via the terminal 32. On the other hand, the moving contact Sc of the switch 69 is connected to a fixed contact Sb which is grounded during a low level period of the switching control signal r. A moving contact Sc of the switch 70 is connected to the contact Sa during a high level period of a switching control signal s shown in FIG. 6(O) which is generated in the timing pulse generating circuit 28 and is obtained via the terminal 30, and is connected to the contact Sb during the low level period of the switching control signal s.

The switching control signal s is inverted in an inverter 72 and is supplied to the sample and hold circuit 71 as a sampling pulse signal. An output signal of the switch 69 from the contact Sc thereof is supplied to the feed motor 17 via a buffer amplifier 73. An output signal w of the switch 70 shown in FIG. 6(S) from the contact Sc thereof is supplied to the actuator 24 as a driving signal therefor via a buffer amplifier 74.

Description will now be given on how the track position of a new track which is to be formed by the head 16 is determined when recording the composite video signal on the recording medium 12 by the recording apparatus according to the present invention.

Figure 6:
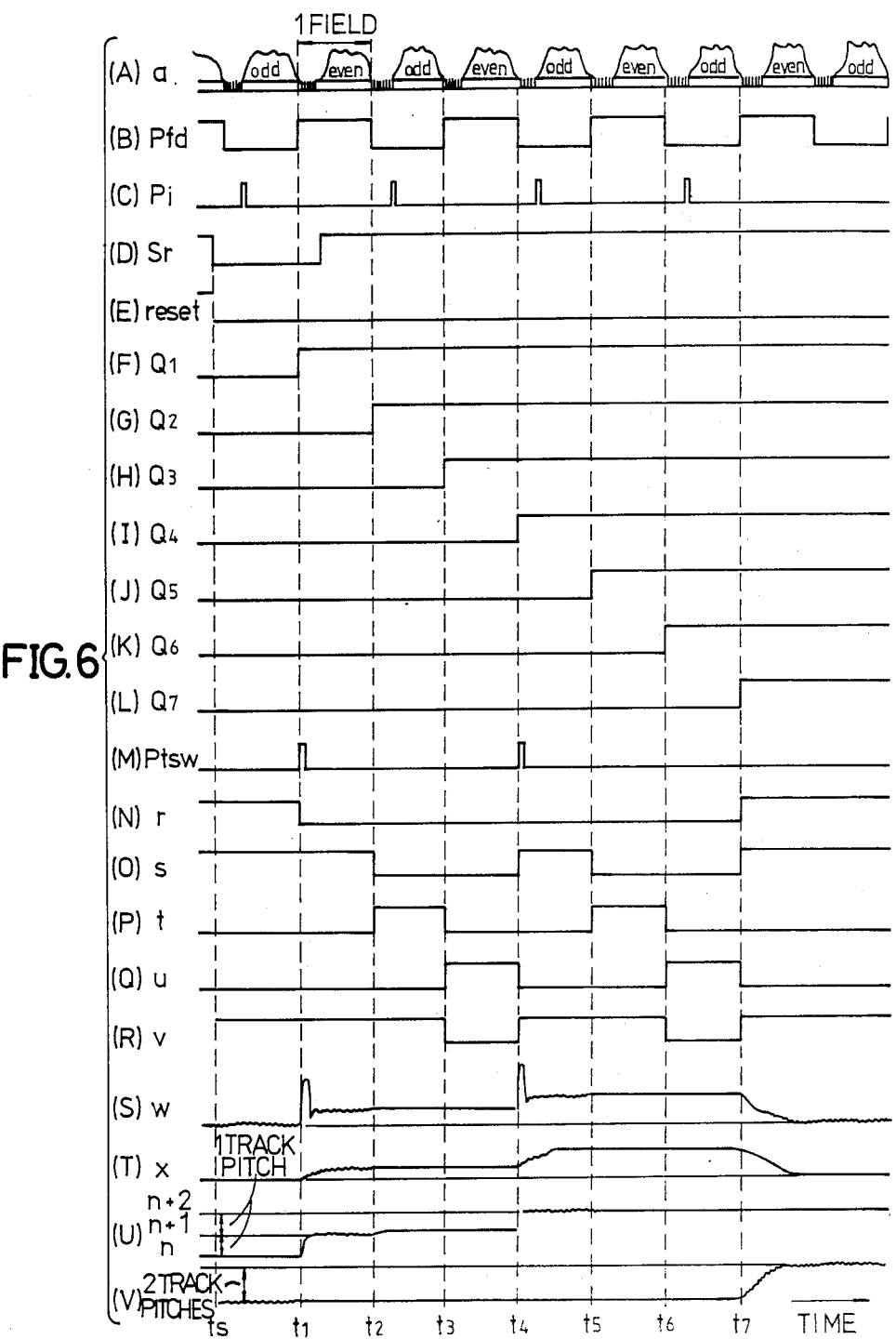

At a time ts in FIG. 6 when the recording apparatus is in a recording standby mode, the gating signal u from the control circuit 15 for controlling the gating circuit 48 has a low level as shown in FIG. 6(Q). In addition, the gating signal v for controlling the gating circuit 52 has a high level as shown in FIG. 6(R).

Accordingly, in the recording standby mode, the reproduced signal from the head 16 is supplied to the reproducing system of the recording apparatus via the gating circuit 52. Since the reproduced signal from the head 16 includes the pilot signal Pp which is used as the control signal for the track position control, the pilot signal detecting circuit 55 which receives the output signal of the preamplifier 53 carries out the operation described before to extract the pilot signal. The pilot signal reproduced from the intended track which is being scanned by the head 16 and the pilot signal reproduced as crosstalk from the track adjacent to the intended track are extracted from the reproduced signal at different time positions on the time base, and the extracted pilot signals are rectified and filtered into the D.C. signal m. This D.C. signal m is supplied to the sample and hold circuit 58.

When it is assumed once again that the head 16 is scanning the position in the vicinity of the intended nth track shown in FIG. 2A, the comparator 64 produces the error signal (voltage) which is dependent on the difference between the pilot signal which is reproduced as crosstalk from the adjacent (n−1)th track and the reference voltage Er.

In this recording standby mode before the time ts shown in FIG. 6 when the switch 27a is manipulated, the switching control signals s and r shown in FIGS. 6(O) and 6(N) which are generated in the timing pulse generating circuit 28 and obtained from the respective terminals 30 and 32 have high levels. Hence, the moving contacts Sc of the switches 69 and 70 are connected to the respective contacts Sa.

The output error signal of the comparator 64 is supplied to the actuator 24 via the comparator 64, the phase compensation circuit 68, the contacts Sa and Sc of the switch 70 and the buffer amplifier 74. On the other hand, the output error signal of the comparator 64 is supplied to the feed motor 17 via the lowpass filter 66, the contacts Sa and Sc of the switch 69 and the buffer amplifier 73. Accordingly, the head 16 is displaced to such a position that the actual displacement and a reference displacement of the head 16 coincide, that is, to a position on the intended nth track which is separated from the adjacent (n−1)th track by the predetermined track pitch. This control is carried out so that the output error signal (voltage) of the comparator 64 approaches zero by the operation of a first loop constituted by the head 16, the reproducing system, the pilot signal detecting circuit 55, the sample and hold circuit 58, the comparator 64, the phase compensation circuit 68, the contacts Sa and Sc of the switch 70, the buffer amplifier 74 and the actuator 24, and by the operation of a second loop constituted by the head 16, the reproducing system, the pilot signal detecting circuit 55, the sample and hold circuit 58, the comparator 64, the contacts Sa and Sc of the switch 69, the buffer amplifier 73, the feed motor 17 and the feeding mechanism.

When the head 16 is positioned as described heretofore, a predetermined setting time elapses after the displacement of the head 16 and the head 16 becomes stationary, the switch 27a of the manipulation part 27 is manipulated at the time ts as shown in FIG. 6(D). Responsive to a first rise in the field discriminating signal Pfd shown in FIG. 6(B) which occurs at a time t1 which is after the time ts, the timing pulse generating circuit 28 generates a track switching (shifting) pulse signal Ptsw shown in FIG. 6(M). Based on this track shifting pulse signal Ptsw, the timing pulse generating circuit 28 generates the switching control signal r which undergoes transition from the high level to a low level at the time t1, and this low level switching control signal r is supplied to the switch 69 via the terminal 32 to switch over and connect the moving contact Sc of the switch 69 from the contact Sa to the contact Sb. As a result, the feed motor 17 stops at the time t1 as shown in FIG. 6(V), and the feeding of the head 16 by the feeding mechanism is stopped. FIG. 6(V) shows the displacement of the carriage 20 caused by the rotation of the feed motor 17.

A circuit part of the timing pulse generating circuit 28 for generating the sampling pulse signal g which is to be supplied to the sample and hold circuit 58 is controlled responsive to the track shifting pulse signal Ptsw generated within the timing pulse generating circuit 28 at the time t1, so as to change the timing of the sampling pulse signal g from that before the time t1. In other words, the timing of the sampling pulse signal g is changed from the timing which is in accordance with the times T1, T4, ... shown in FIG. 2A so as to position the head 16 on the nth track on the recording medium 12 to a timing which is in accordance with the times T2, T5, ... shown in FIG. 2A so as to position the head 16 on the (n+1)th track. The sampling pulse signal g having this new timing is supplied to the sample and hold circuit 58 from the time t1.

After the timing of the sampling pulse signal g is changed at the time t1 from the timing which is in accordance with the times T1, T4, ... shown in FIG. 2A so as to position the head 16 on the nth track on the recording medium 12 to the timing which is in accordance with the times T2, T5, ... shown in FIG. 2A so as to position the head 16 on the (n+1)th track, the sample and hold circuit 58 samples and holds the pilot signal which is reproduced as crosstalk from the nth track which is now the adjacent track to the new intended (n+1)th track. Thus, the voltage which is supplied to the comparator 64 from the sample and hold circuit 58 after the time t1 is considerably different from the reference voltage Er from the reference voltage source 65. The error signal which is dependent on this large difference between the output voltage of the sample and hold circuit 58 and the reference voltage Er is produced from the comparator 64.

In this state, the switching control signal s which is generated from the timing pulse generating circuit 28 and is obtained via the terminal 30 has a high level. For this reason, the moving contact Sc of the switch 70 is connected to the contact Sa. Hence, the output error signal of the comparator 64 is supplied to the actuator 24 via the phase compensation circuit 68, the contacts Sa and Sc of the switch 70, and the buffer amplifier 74. The first loop described before operates so that the actual displacement of the head 16 coincides with the reference displacement, that is, so that the head 16 is positioned on the new intended (n+1)th track which is separated from the adjacent nth track by the predetermined track pitch and the output error signal (voltage) of the comparator 64 approaches zero. As shown in FIG. 6(U), the head 16 correctly scans over the new intended (n+1)th track on the recording medium 12. FIG. 6(U) shows the displacement of the head 16.

When the head 16 is positioned as described above, a predetermined setting time elapses and the head 16 becomes stationary. The changes occurring when the head 16 is shifted from the nth track to the (n+1)th track are shown between the times t1 and t2 in FIG. 6.

At the time t2 when the head 16 has already reached the new intended (n+1)th track, the predetermined setting time has already elapsed and the head 16 is stationary, the level of the switching control signal s generated from the timing pulse generating circuit 28 changes from the high level to a low level as shown in FIG. 6(O). Thus, the moving contact Sc of the switch 70 is switched over and connected from the contact Sa to the contact Sb. In addition, a high level signal which is obtained by inverting the switching control signal s in the inverter 72 is supplied to the sample and hold circuit 71 as the sampling pulse signal. Consequently, the output error signal of the comparator 64 at the time t2 is passed through the lowpass filter 67 and is sampled and held in the sample and hold circuit 71. The sampled and held signal from the sample and hold circuit 71 after the time t2 inclusive is supplied to the actuator 24 via the buffer amplifier 74. The actuator 24 operates after the time t2 so as to maintain the position of the head 16 at the time t2.

In the time chart shown in FIG. 6, the pulse of the track shifting pulse signal Ptsw is also generated within the timing pulse generating circuit 28 at a time t4 which is three vertical scanning periods after the time t1. hence, an operation similar to that started from the time t1 is started from the time t4. In other words, the head 26 is shifted from the (n+1)th track to the (n+2)th track during the time period between the times t4 and t5, and the actuator 24 operates after the time t5 so as to maintain the position of the head 16 at the time t5.

Furthermore, in the timing chart shown in FIG. 6, the levels of the switching control signals s and r which are generated from the timing pulse generating circuit 28 respectively change from the low levels to high levels at a time t7 which is two vertical scanning periods after the time t5. As a result, the moving contacts Sc of the switches 69 and 70 are switched over and connected from the respective contacts Sb to the respective contacts Sa at the time t7.

Accordingly, the first loop described before operates so that the actual displacement of the head 16 coincides with the reference displacement, that is, so that the head 16 correctly scans the new intended track which is separated from the adjacent track previously scanned by the head 16 by the predetermined track pitch and the output error signal (voltage) of the comparator 64 approaches zero. However, in the case where the first loop is a second order system, the gain is not infinity, and there is a slight error between the reference displacement and the actual displacement of the head 16. This slight error is amplified and supplied to the actuator 24 via the comparator 64 which carries out the comparison. Hence, although there is a slight error between the reference displacement and the actual displacement of the head 16, the error is usually under 1% and negligible. In addition, the output error signal of the comparator 64 is supplied to the feed motor 17 via the lowpass filter 66, the contacts Sa and Sc of the switch 69 and the buffer amplifier 73. The second loop described before operates so that the actual displacement of the head 16 coincides with the reference displacement, that is, so that the head 16 correctly scans the new intended track which is separated from the adjacent track by the predetermined track pitch and the output error signal (voltage) of the comparator 64 approaches zero. Therefore, the position of the head 16 is automatically controlled so as to correctly scan the intended track on the recording medium 12.

As is clear from the description given heretofore, the head 16 is quickly shifted to a new intended track which is separated from a track which was previously scanned by the head 16 by the predetermined track pitch, every time the pulse of the track shifting pulse signal Ptsw is generated within the timing pulse generating circuit 28 of the control circuit 15. After the predetermined setting time elapses from the shifting of the head 16 to the new intended track, the head 16 is correctly positioned on the new intended track.

As will be described later, FIG. 6(E) shows a reset pulse signal which is supplied to flip-flops constituting the timing pulse generating circuit 28, and FIGS. 6(F) through 6(L) respectively show outputs of these flip-flops.

By carrying out the operations described heretofore, it is possible to successively form new tracks on the recording medium 12 with the predetermined track pitch. However, a mechanical vibration is always generated as the head 16 is quickly shifted from one track to another, and this mechanical vibration usually occurs for a time period longer than the vertical blanking period of the composite video signal. For example, in order to record on two mutually adjacent closed loop tracks of the recording medium 12 signals related to two consecutive fields on the time base (that is, a signal amounting to one frame of the composite video signal), the signal related to the first field must first be recorded on one track of the two mutually adjacent tracks making up a track pair and the head 16 must thereafter be shifted by one track pitch within the vertical blanking period of the composite video signal to the track position of the other track of the track pair so as to record the signal related to the second field on this other track. But when the head 16 is shifted, it takes a predetermined setting time until the head 16 becomes correctly positioned on the intended track. In other words, the head 16 will not become stationary until the mechanical vibration ceases, and since the mechanical vibration occurs for the time period longer than the vertical scanning period of the composite video signal, it is virtually impossible to satisfactorily record the signals related to the two consecutive fields without loss of information on the two mutually adjacent tracks.

Accordingly, in the recording apparatus of the present invention, the composite video signal which is to be recorded uses the horizontal and vertical scan in conformance with the 2:1 interlaced scanning, and the composite video signal amounting to one field is recorded on each track so that out of two mutually adjacent tracks making up a track pair, a signal related to an odd (or even) field out of signals which are related to two consecutive fields and constitute a picture is recorded on one track of the track pair and a signal related to an even (or odd) field out of signals which are related to two consecutive fields and constitute a picture is recorded on the other track of the track pair, so that signals amounting to one frame are recorded on the track pair. The recording apparatus uses the crosstalk component which is reproduced from an adjacent pre-recorded track which is adjacent to an intended track which is to be newly formed so as to control the position of the intended track when successively forming closed loop tracks on the rotary recording medium. A time difference of three or more odd integral multiple of one field exists between the two signals which are recorded on the track pair.

Therefore, according to the recording apparatus of the present invention, signals which amount to one frame and comprise a signal related to an odd (or even) field out of signals which are related to two consecutive fields and constitute a picture and a signal related to an even (or odd) field out of signals which are related to two consecutive fields and constitute a picture are recorded on the track pair made up of two mutually adjacent tracks of the rotary recording medium which is rotated with the rotation period of one field. After the signal related to the odd (or even) field is recorded on one track of the track pair, a scanning element is quickly shifted to the position of the other track of the track pair which is to be newly formed and is separated from the one track by the predetermined track pitch. After the mechanical vibration of the scanning element ceases and the scanning element is correctly positioned on the other track of the track pair, the signal related to the even (or odd) field is recorded on this other track. The signal related to the even field is always recorded on this other track of the track pair when the signal related to the odd field is recorded on the one track of the track pair, and the signal related to the odd field is always recorded on this other track of the track pair when the signal related to the even field is recorded on the one track of the track pair. As a result, it is possible to satisfactorily record the signals amounting to one frame of the composite video signal on each of the track pairs of the rotary recording medium.

The signals which amount to one frame and are recorded on the track pair simply needs to be made up of a signal related to an odd (or even) field out of signals which are related to two consecutive fields and constitute a picture and a signal related to an even (or odd) field out of signals which are related to two consecutive fields and constitute, where a time difference of three or more odd integral multiple of one field exists between the two signals which are recorded on the track pair.

When the signal related to the odd field is always recorded on a first track of the track pair and the signal related to the even field is always recorded on a second track of the track pair or vice versa for each of the track pairs of the rotary recording medium, it is possible to simplify the signal processing at the time of the reproduction. In order to further simplify the signal processing at the time of the reproduction, the field index signal Pi which is added should have a simple signal format.

It is not essential for each track pair of the rotary recording medium to consist of a first track recorded with the signal related to the odd field and a second track recorded with the signal related to the even field or vice versa. In other words, the first and second tracks may be respectively recorded with the signals related to the odd and even fields for one track pair, and the first and second tracks may be respectively recorded with the signals related to the even and odd fields for another track pair. In this case, a simple code may be added to the signal related to the odd field and to the signal related to the even field, so that it is possible to distinguish whether the signal relates to the odd or even field.

The time difference (three or mode odd integral multiple of one field) between the two signals recorded on each of the track pairs of the rotary recording medium need not be constant. For example, a time difference of three fields may exist between the two signals recorded on one track pair and a time difference of five fields may exist between the two signals recorded on another track pair.

Furthermore, when recording the signals amounting to one frame on each of the track pairs of the rotary recording medium, it is desirable that an erasing operation is performed for at least one field before the recording is carried out with respect to each track.

Description will now be given with respect to the embodiment of operation of the the recording apparatus according to the present invention for the case where the rotary recording medium is the cylindrical magnetic recording medium 12, and the signals which amount to one frame and are recorded on each of the track pairs of the recording medium 12 consist of a signal related to an odd field and a signal related to an even field which have a time difference of three fields. In addition, after the head 16 is quickly shifted to the position of a new intended track which is to be formed, an erasing operation is performed with respect to this new intended track for at least one field to erase signals pre-recorded thereon. After this erasing operation, the signal related to one field is recorded on the new intended track. In other words, when recording the signal on an intended track of the recording medium 12, the head 16 is first in a reproducing state for at least one field to control the track position of the intended track based on the signal which is reproduced as crosstalk from a track adjacent to the intended track, the head 16 then performs the erasing operation for at least one field to erase signals pre-recorded on the intended track, the head 16 finally records the signal related to one field on the intended track, and the head 16 is shifted to the track position of a new intended track after the recording of the intended track is completed. Such a sequence of operations of the head 16 is carried out two times to record the signal amounting to one frame on each of the track pairs of the recording medium 12.

Figure 7:
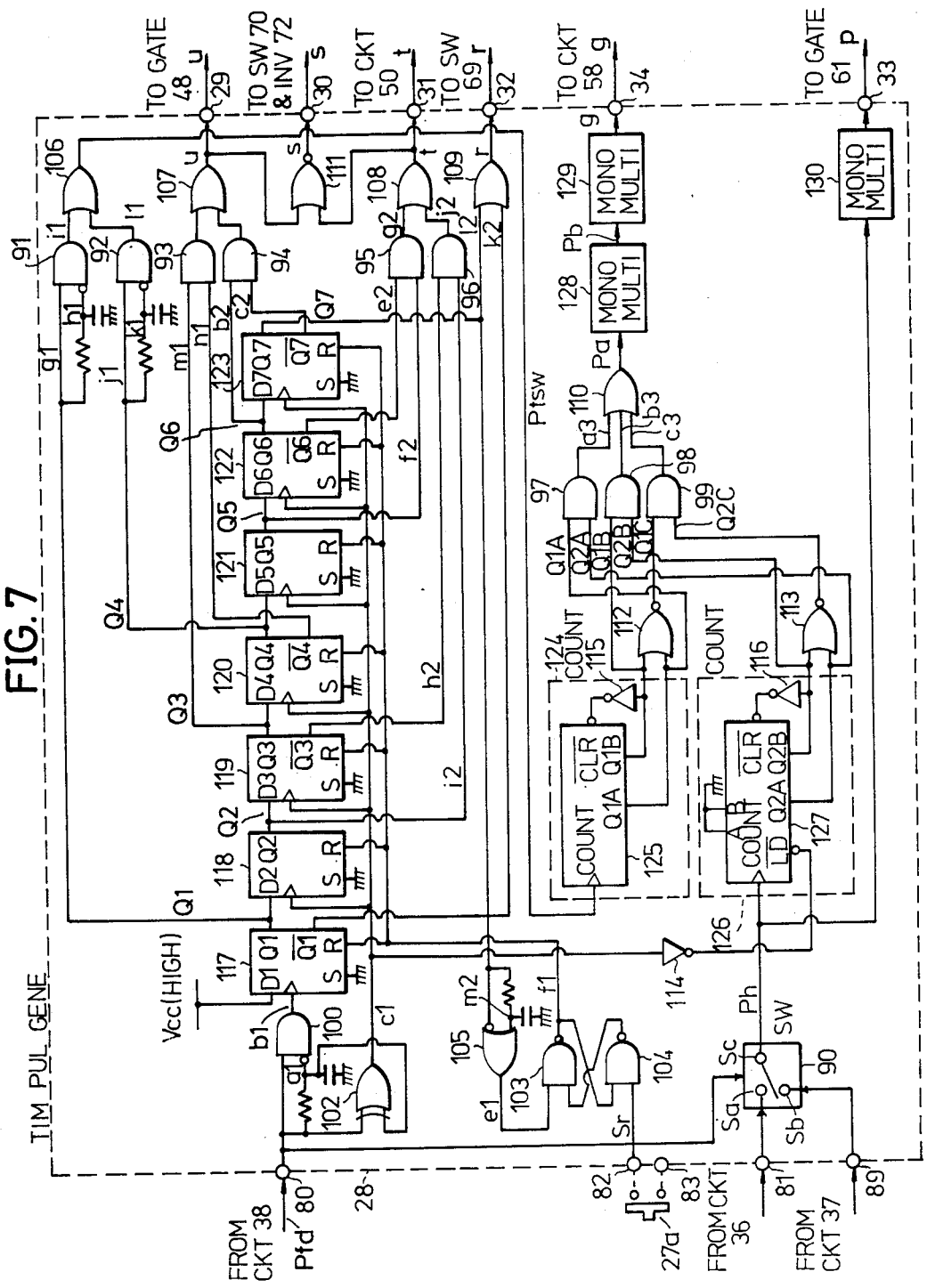
FIG. 7 is a system circuit diagram showing an embodiment of a timing pulse generating circuit within the block system shown in FIG. 1.

In order to carry out the recording operation with the timings of the time chart shown in FIG. 6, the timing pulse generating circuit 28 shown in FIG. 1 may have a construction shown in FIG. 7. In FIG. 7, those parts which are the same as those corresponding parts in FIG. 1 are designated by the same reference numerals, and description thereof will be omitted.

In FIG. 7, the field discriminating signal Pfd from the field discriminating signal generating circuit 38 is applied to an input terminal 80, the horizontal synchronizing signal from the separating circuit 36 is applied to an input terminal 81, the horizontal synchronizing signal from the separating circuit 37 is applied to an input terminal 89, and the output signal (ON/OFF information) of the switch 27a of the manipulation part 27 is applied to terminals 82 and 83. The signals u, s, t, r, p and g described before are outputted via the terminals 29 through 34. The timings of these signals u, s, t, r, p and g were described before in conjunction with FIGS. 5 and 6.

Figure 8A:
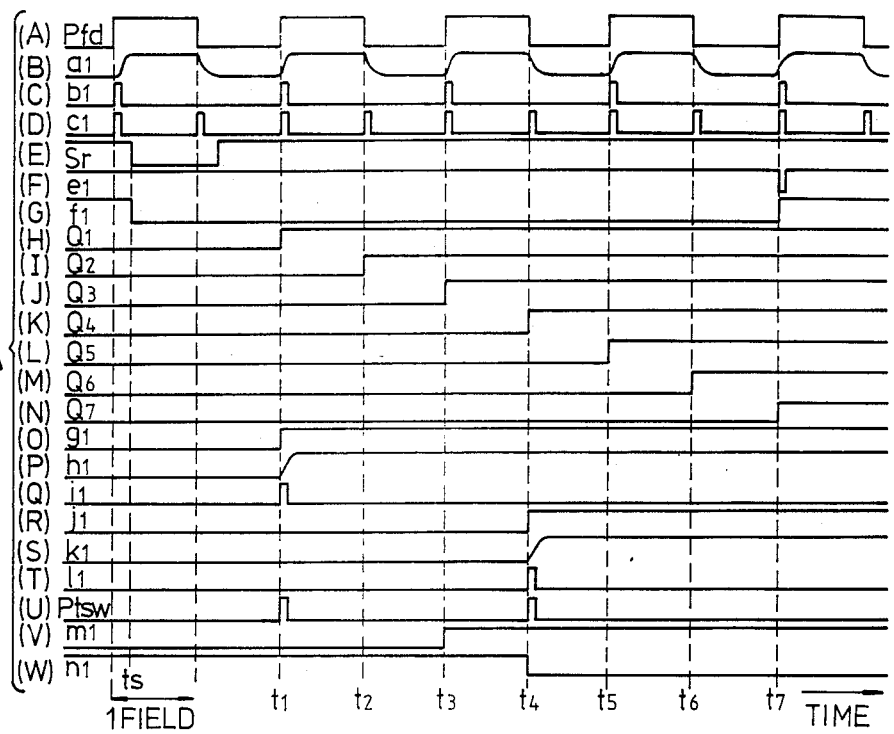
FIG. 8A(A) through 8A(W), FIGS. 8B(A) through 8B(T)
Figure 8B:
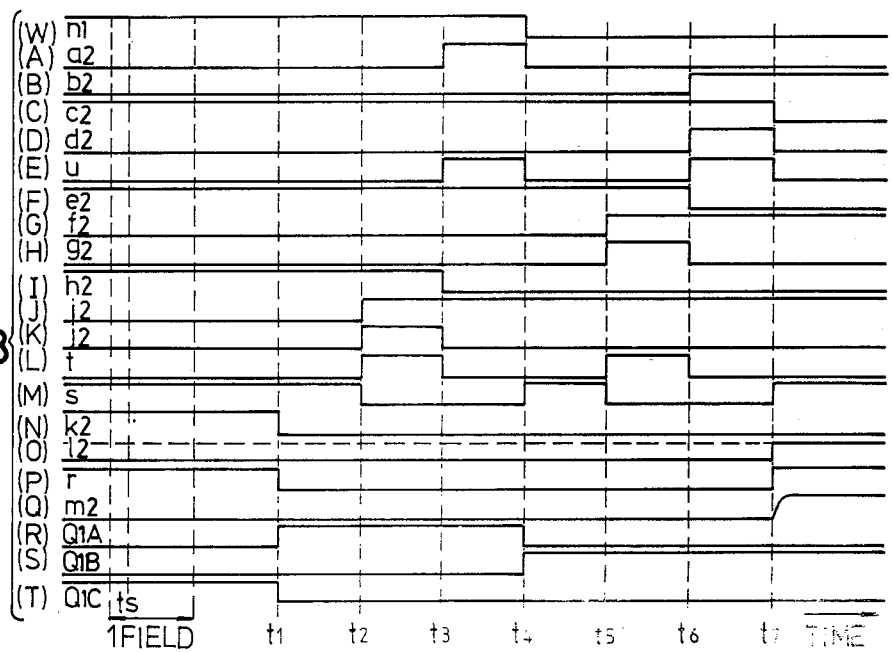
Figure 9:
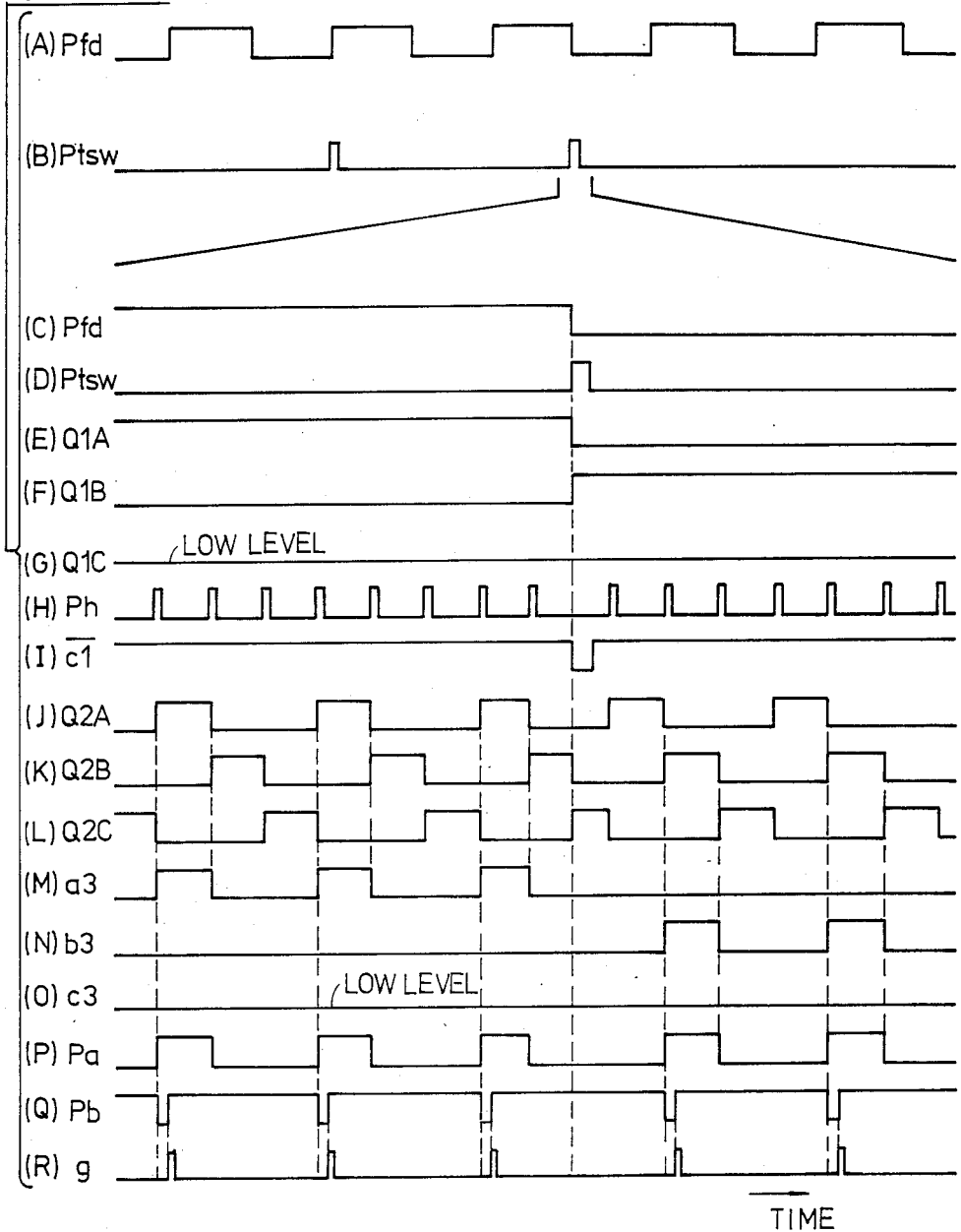
FIGS. 9(A) through 9(R) and FIGS. 10(A) through 10(P) are timing charts for explaining the operation of the timing pulse generating circuit.

The timing pulse generating circuit 28 shown in FIG. 7 generally comprises a switching circuit 90, AND circuits 91 through 100, an exclusive-OR circuit 102, NAND circuits 103 and 104, OR circuits 105 through 110, NOR circuits 111 through 113, inverters 114 through 116, delay type flip-flops 117 through 123, a ternary counter 124 comprising a synchronous binary counter 125 and the inverter 115, a ternary counter 126 comprising a synchronous binary counter 127 and the inverter 116, and monostable multivibrators 128 through 130. FIGS. 8A, 8B and 9 are timing charts for explaining the timings of various signals generated in the timing pulse generating circuit 28 shown in FIG. 7. In FIGS. 8A and 8B, the times ts and t1 through t7 shown below the signal waveforms correspond to the times ts and t1 through t7 shown in FIG. 6, respectively.

The operation of the timing pulse generating circuit 28 shown in FIG. 7 may be readily understood from the timing charts shown in FIGS. 8A, 8B and 9, and for this reason, only a brief description will be given on the operation of the timing pulse generating circuit 28.

The field discriminating signal Pfd shown in FIG. 8A(A) is applied to the input terminal 80, and the signal Sr from the switch 27a shown in FIG. 8A(E) is applied to the input terminals 82 and 83. The horizontal synchronizing signals from the separating circuits 36 and 37 are applied to the respective input terminals 81 and 89 and are supplied to fixed contacts Sa and Sb of the switching circuit 90, respectively. A moving contact Sc of the switching circuit 90 is connected to the contact Sa during a low level period of the field discriminating signal Pfd and is connected to the contact Sb during a high level period of the field discriminating signal Pfd. By the operation of the circuit part including the AND circuits 91 through 96 and 100, the exclusive-OR circuit 102, the NAND circuits 103 and 104, the OR circuits 105 through 109, the NOR circuits 111 through 113 and the flip-flops 117 throgh 123, the signals having the timings shown in FIGS. 8A and 8B are generated within the timing pulse generating circuit 28, and the signals u, s, t, r, p and g are outputted via the terminals 29 through 34.

FIG. 8A(A) shows the field discriminating signal Pfd, FIG. 8A(B) shows a signal a1 applied to one input of the AND circuit 100, FIG. 8A(C) shows a signal b1 produced from the AND circuit 100, FIG. 8A(D) shows a signal c1 produced from the exclusive-OR circuit 102, FIG. 8A(E) shows the signal Sr from the switch 27a, FIG. 8A(F) shows a signal e1 produced from the OR circuit 105, and FIG. 8A(G) shows a signal f1 produced from the NAND circuit 103. FIGS. 8A(H) through 8A(N) respectively show output signals Q1 through Q7 of the flip-flops 117 through 123 obtained from respective output terminals Q1 through Q7 thereof. Fig.8A(O) shows a signal g1 applied to one input of the AND circuit 91, FIG. 8A(P) shows a signal h1 applied to the other input of the AND circuit 91, FIG. 8A(Q) shows a signal i1 produced from the AND circuit 91, FIG. 8A(R) shows a signal j1 applied to one input of the AND circuit 92, FIG. 8A(S) shows a signal k1 applied to the other input of the AND circuit 92, FIG. 8A(T) shows a signal l1 produced from the AND circuit 92, FIG. 8A(U) shows the track shifting pulse signal Ptsw produced from the OR circuit 106, FIG. 8A(V) shows a signal m1 (Q3) applied to one input of the AND circuit 93, and FIGS. 8A(W) and 8B(W) show a signal n1 (inverted Q4) applied to the other input of the AND circuit 93.

FIG. 8B(A) shows a signal a2 produced from the AND circuit 93, FIG. 8B(B) shows a signal b2 (Q6) applied to one input of the AND circuit 94, FIG. 8B(C) shows a signal c2 (inverted Q7) applied to the other input of the AND circuit 94, FIG. 8B(D) shows a signal d2 produced from the AND circuit 94, and FIG. 8B(E) shows the signal u produced from the OR circuit 107. FIG. 8B(F) shows a signal e2 (inverted Q6) applied to one input of the AND circuit 95, FIG. 8B(G) shows a signal f2 (Q5) applied to the other input of the AND circuit 95, FIG. 8B(H) shows a signal g2 produced from the AND circuit 95, FIG. 8B(I) shows a signal h2 (inverted Q3) applied to one input of the AND circuit 96, FIG. 8B(J) shows a signal i2 (Q2) applied to the other input of the AND circuit 96, FIG. 8B(K) shows a signal j2 produced from the AND circuit 96, and FIG. 8B(L) shows the signal t produced from the OR circuit 108. FIG. 8B(M) shows the signal s produced from the NOR circuit 111, FIG. 8B(N) shows a signal k2 (inverted Q1) applied to one input of the OR circuit 109, FIG. 8B(O) shows a signal l2 (Q7) applied to the other input of the OR circuit 109, FIG. 8B(P) shows the signal r produced from the OR circuit 109, and FIG. 8B(Q) shows a signal m2 applied to one input of the OR circuit 105. FIGS. 8B(R) and 8B(S) respectively show outputs Q1A and Q1B of the counter 124, and FIG. 8B(T) shows an output Q1C of the NOR circuit 112.

The signal p outputted via the output terminal 33 is not shown in FIGS. 8A, 8B and 9, but this signal p is produced from the monostable multivibrator 130 which is triggered responsive to the output horizontal synchronizing signal obtained from the switching circuit 90. The signal p has a predetermined pulse width and is produced for every horizontal synchronizing signal.

The timing of the sampling pulse signal g outputted via the output terminal 34 is sequentially changed to one of the three possible timings responsive to the track shifting pulse signal Ptsw. The track shifting pulse signal Ptsw shown in FIGS. 8A(U) and 9(D) is supplied to the counter 124 as a clock pulse. Hence, the outputs Q1A and Q1B shown in FIGS. 8B(R) and 9(E) and FIGS. 8B(S) and 9(F) are obtained from the counter 124, and the output Q1C shown in FIGS. 8B(T) and 9(G) is obtained from the NOR circuit 112. On the other hand, the loading to the counter 126 is asynchronous. The signal c1 shown in FIG. 8A(D) which is obtained at the leading edge of the field discriminating signal Pfd applied to the terminal 80 is inverted into a signal $\overline{c1}$ shown in FIG. 9(I) in the inverter 114, and this inverted signal $\overline{c1}$ resets the counter 126 (counter 127). In addition, the horizontal synchronizing signal Ph from the terminal 89 is supplied to the counter 126 (counter 127) as a clock pulse. As a result, outputs Q2A and Q2B shown in FIGS. 9(J) and 9(K) are obtained from the counter 127, and an output Q2C shown in FIG. 9(L) is obtained from the NOR circuit 113.

The outputs Q1A, Q1B, Q1C, Q2A, Q2B and Q2C are formed into a pulse signal Pa shown in FIG. 9(P) by the operation of the ligic circuit constituted by the AND circuits 97 through 99 and the OR circuit 110. This pulse signal Pa has a high level with an invertal of three horizontal scanning periods, and the pulse width thereof is one horizontal scanning period. In other words, the interval between two consecutive high levels of the pulse signal Pa is two horizontal scanning periods. The pulse signal Pa produced from the OR circuit 110 triggers the monostable multivibrator 128.

Hence, a pulse signal Pb shown in FIG. 9(Q) is produced from the monostable multivibrator 128, and this pulse signal Pb triggers the monostable multivibrator 129. As a result, the sampling pulse signal g shown in FIG. 9(R) is produced from the monostable multivibrator 129. The counted value in the counter 124 changes in circulation every time the track shifting pulse signal Ptsw is supplied thereto as the clock pulse. For this reason, the timing of the sampling pulse signal g also changes in circulation among three possible timings every time the track shifting pulse signal Ptsw is newly applied to the counter 124. A first timing of the sampling pulse signal g is for sampling a the times T1, T4, . . . shown in FIG. 2A, a second timing of the sampling pulse signal g is for sampling at the times T2, T5, . . . , and a third timing of the sampling pulse signal g is for sampling at the times T3, T6, . . . .

Figure 10:
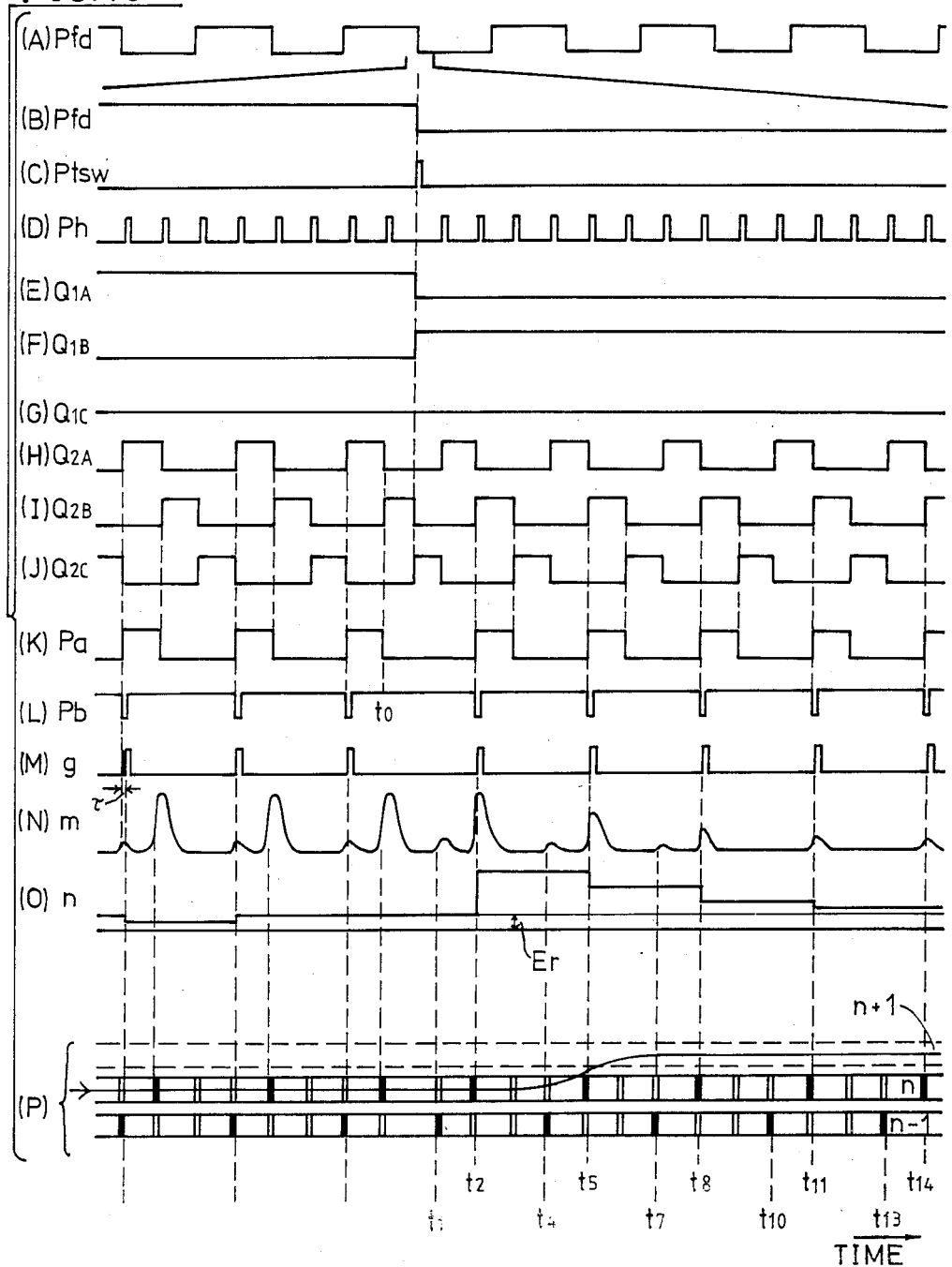

FIG. 10(A) shows the field discriminating signal Pfd, and FIG. 10(B) shows this field discriminating signal Pfd on an expanded time base. FIGS. 10(C) and 10(D) respectively show the track shifting pulse signal Ptsw and the horizontal synchronizing signal Ph. FIGS. 10(E) through 10(G) respectively show the outputs Q1A, Q1B and Q1C obtained from the counter 124 and the NOR circuit 112. FIGS. 10(H) through 10(J) respectively show the outputs Q1A Q2B and Q2C obtained from the counter 126 and the NOR circuit 113. FIGS. 10(K) through 10(M) respectively show the output pulse signal Pa of the OR circuit 110 and the output pulse signals Pb and g of the monostable multivibrators 128 and 129. FIGS. 10(N) and 10(O) respectively show the signals m and n described before in conjunction with FIG. 1 in correspondence with the signals shown in FIGS. 10(A) through 19(M). FIG. 10(P) shows the scanning locus of the head 16 in correspondence with the signals shown in FIGS. 19(A) through 10(O).

Figure 4:
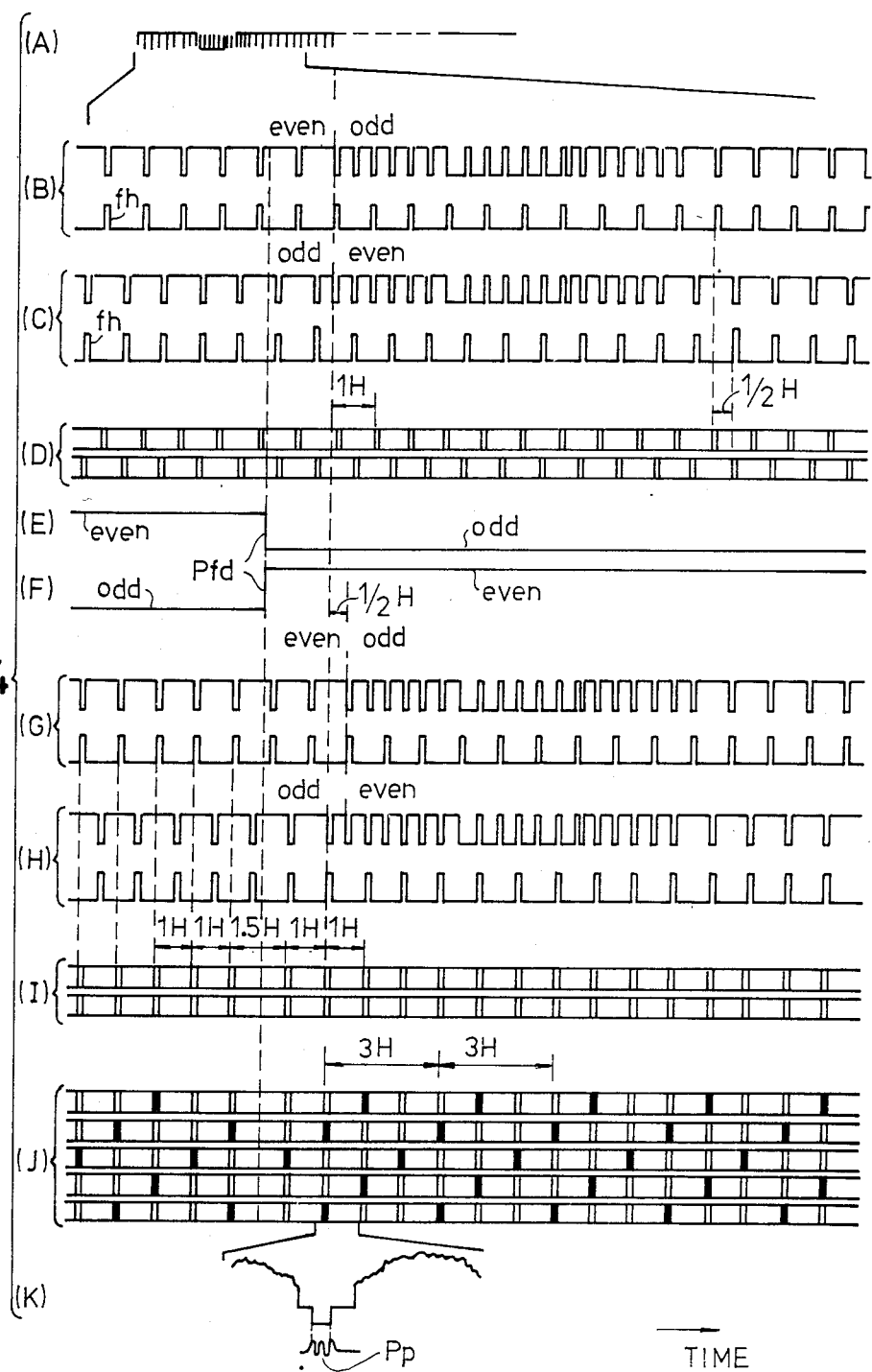
FIGS. 4(A) through 4(K) are timing charts for explaining the operation of the field delay circuit.

The timing of the sampling pulse signal g generated in the timing pulse generating circuit 28 changes in circulation among the three possible timings as described before responsive to the track shifting pulse signal Ptsw. In other words, the sampling pulse signal g takes the first timing responsive to a first incoming track shifting pulse signal Ptsw, takes the second timing responsive to a second incoming track shifting noise signal Ptsw, takes the third timing responsive to a third incoming track shifting pulse signal Ptsw, takes the first timing again responsive to a fourth incoming track shifting pulse signal Ptsw and so on. Thus, the sampling pulse signal g supplied to the sample and hold circuit 58 from the terminal 34 is in correspondence with the time position of the horizontal synchronizing signal for every three horizontal scanning periods. This is because in the present embodiment, the pilot signal Pp which is used for controlling the position of the intended track which is to be formed is recorded at the time position of the horizontal synchronizing signal within the horizontal blanking period with the interval of three horizontal scanning periods as shown in FIGS. 2A, 4 and 10. Hence, the timing of the sampling pulse signal g enables extraction of the pilot signal portion which is reproduced as crosstalk from the track which is adjacent to the intended track which is to be formed.

Figure 11:
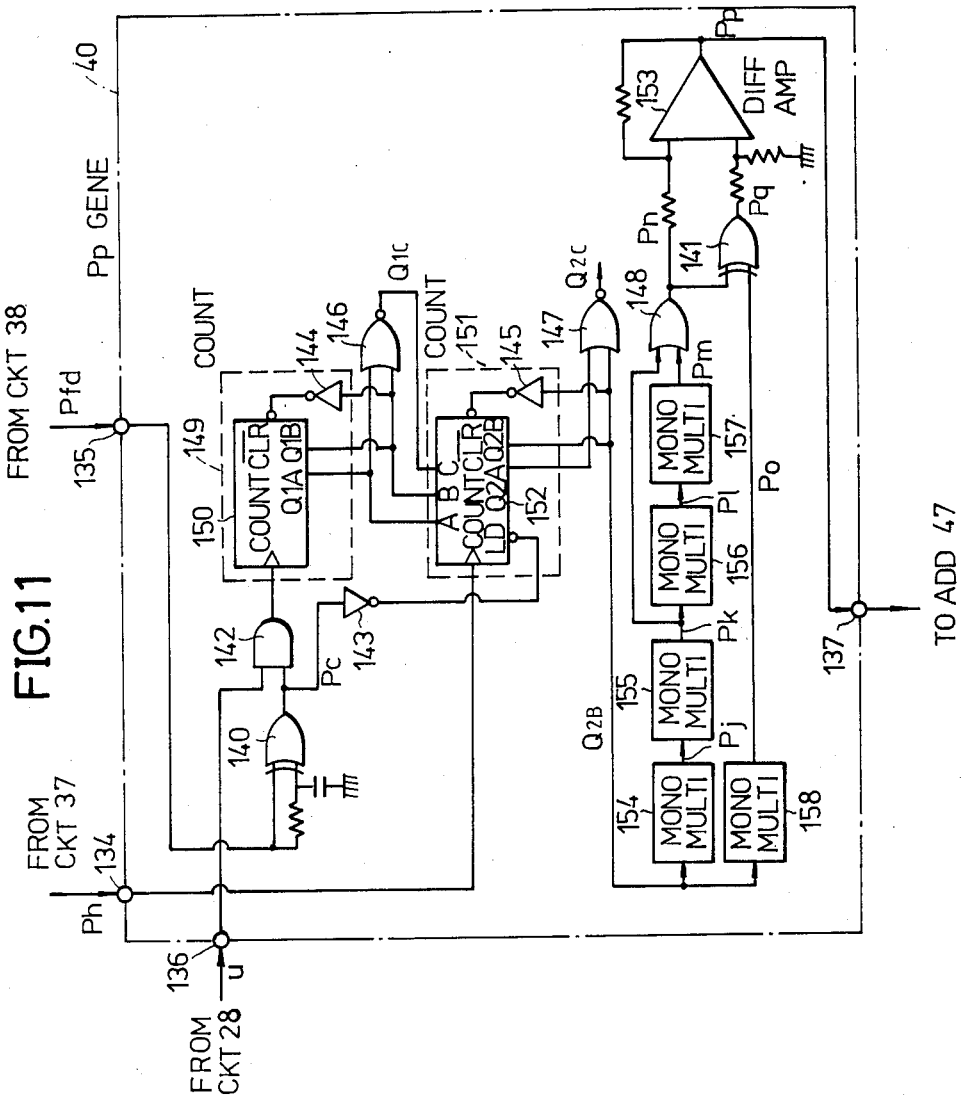
FIG. 11 is a system circuit diagram for explaining an embodiment of a pilot signal generating circuit within the block system shown in FIG. 1.

In order to insert the pilot signal Pp at the time position of the horizontal synchronizing signal within the horizontal blanking period with the interval of three horizontal scanning periods, the pilot signal generating circuit 40 having the construction shown in FIG. 11 may be used to supply the pilot signal Pp to the adder 47 shown in FIG. 1. In FIG. 11, those parts which are the same as those corresponding parts in FIG. 1 are designated by the same reference numerals, and description thereof will be omitted.

Figure 12:
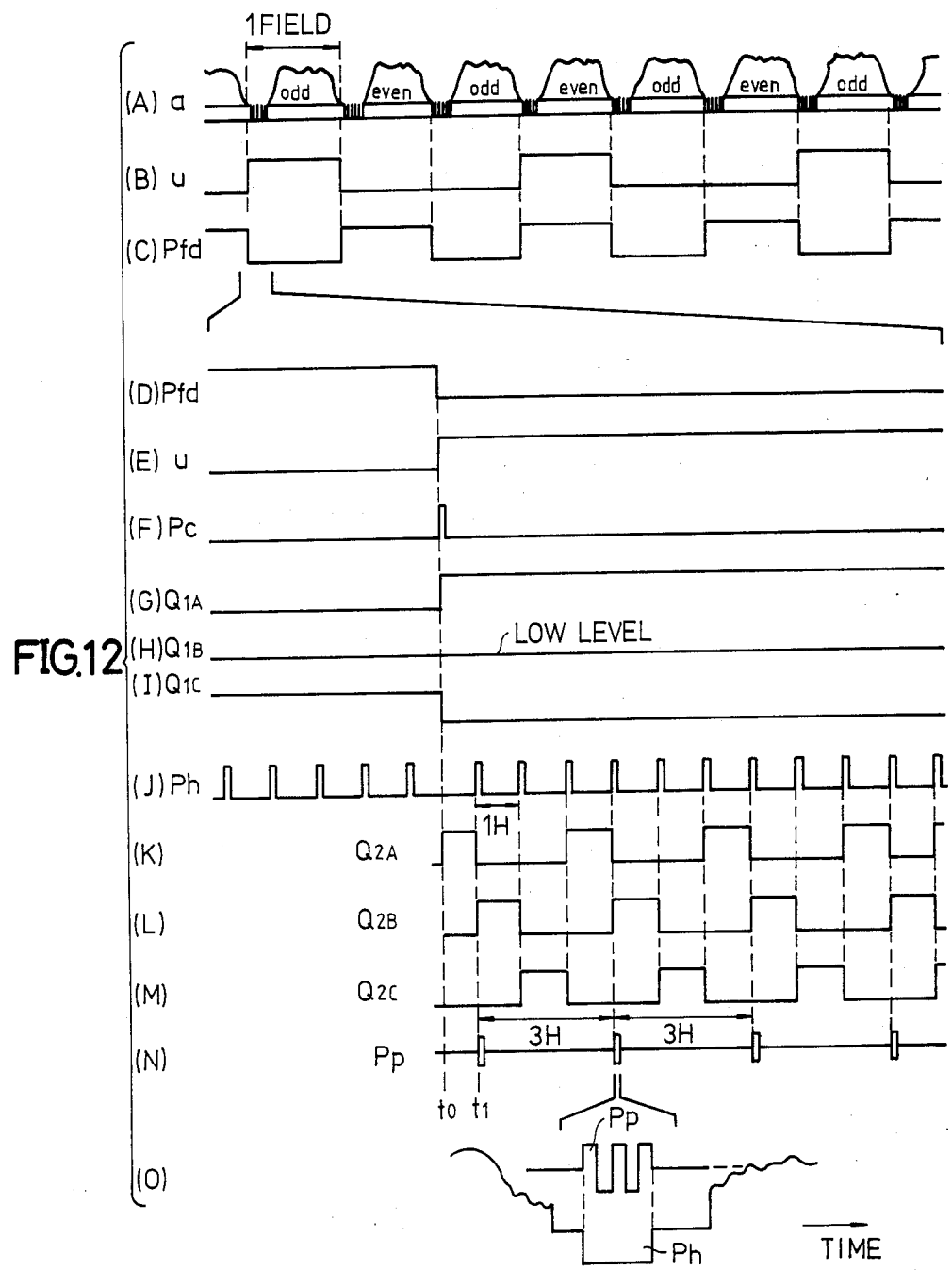
FIGS. 12(A) through 12(O) and FIGS. 13(A) through 13(H) are timing charts for explaining the operation of the pilot signal generating circuit.
Figure 13:
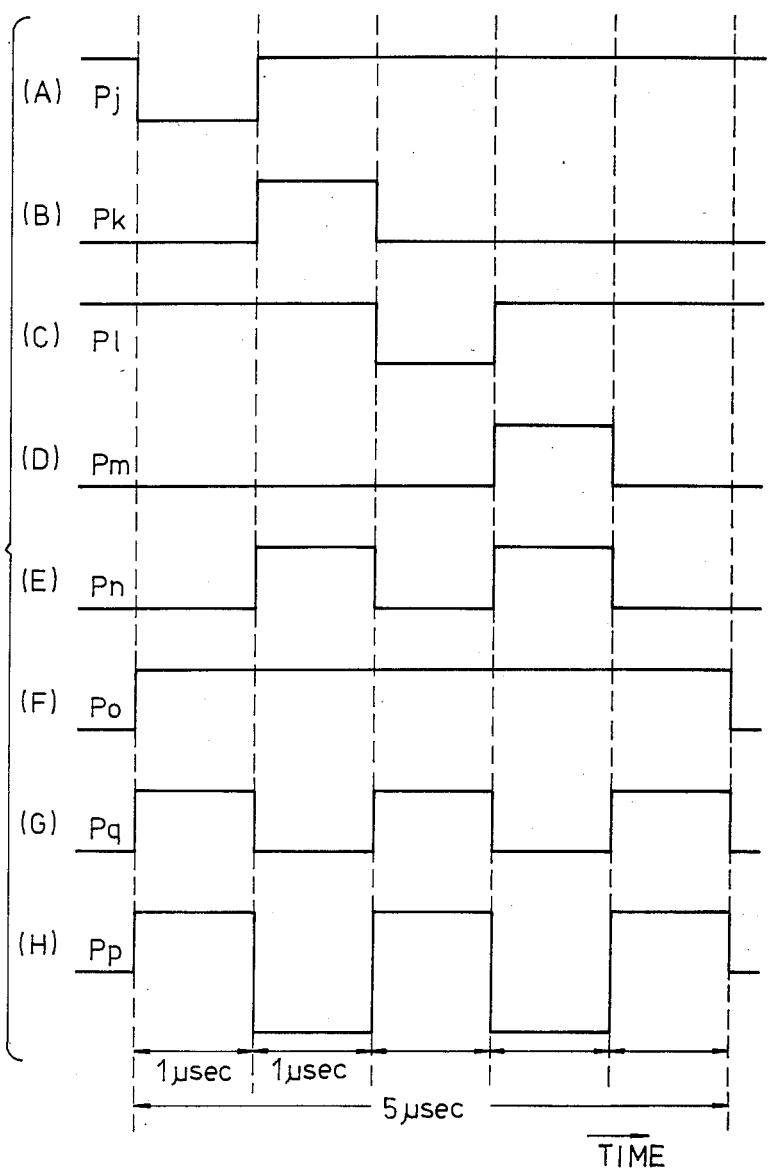

In FIG. 11, the horizontal synchronizing signal Ph from the separating circuit 37 is applied to an input terminal 134. The field discriminating signal Pfd is applied to an input terminal 135, the signal u is applied to an input terminal 136, and the pilot signal Pp is outputted via an output terminal 137. The pilot signal generating circuit 40 generally comprises exclusive-Or circuits 140 and 141, an AND circuit 142, inverters 143 through 145, NOR circuits 146 and 147, and OR circuit 148, a ternary counter 149 comprising a synchronous binary counter 150 and the inverter 144, a ternary counter 151 comprising a synchronous binary counter 152 and the inverter 145, a differential amplifier 153, and monostable multivibrators 154 through 158. FIGS. 12 and 13 are timing charts for explaining the timings of various signals generated in the pilot signal generating circuit 40 shown in FIG. 11.

The operation of the pilot signal generating circuit 40 shown in FIG. 11 can readily be understood from the timing charts shown in FIGS. 12 and 13, and only a brief description will be given on the operation of the pilot signal generating circuit 40. FIG. 12(A) shows the composite video signal a from the composite video signal generating source 26.

The horizontal synchronizing signal Ph shown in FIGS. 12(J) and 12(O) is applied to the input terminal 134, and the field discriminating signal Pfd shown in FIGS. 12(C) and 12(D) is applied to the input terminal 135. In addition, the signal u shown in FIGS. 12(B) and 12(E) is applied to the input terminal 136. This signal u is the gating signal u which is is supplied to the gating circuit 48 shown in FIG. 1.

The exclusive-OR circuit 140 which is supplied with the field discriminating signal Pfd from the input terminal 135 produces a pulse signal Pc shown in FIG. 12(F) at the rise or fall in the field discriminating signal Pfd. The pulse signal Pc is supplied to one input of the AND circuit 142 and to a load terminal LD of the counter 152 within the counter 149 via the inverter 143. The counter 150 has a synchronous clear terminal and an asynchronous load terminal. The horizontal synchronizing signal Ph is supplied to a clock terminal of the counter 152 within the counter 151.

The signal u from the input terminal 136 is supplied to the other input of the AND circuit 142, and an output signal of the AND circuit 142 is supplied to a clock terminal of the counter 150 as a clock pulse during the high level period of the signal u, that is, in correspondence with the pulse signal Pc which is generated at the time when the recording of the composite video signal amounting to one field is started.

When the clock pulse is supplied to the clock terminal of the counter 149 (that is, the counter 150) at a time t0 in FIG. 12, outputs Q1A and Q1B of the counter 150 and an output Q1C of the NOR circuit 146 undergo a transition at the time t0 as shown in FIGS. 12(G) through 12(I). These outputs Q1A, Q1B and Q1C are loaded (preset) into the counter 151 (that is, the counter 152), and outputs Q2A and Q2B of the counter 152 and an output Q2C of the NOR circuit 147 undergo a transition at the time t0 as shown in FIGS. 12(K) through 12(M). The horizontal synchronizing signal Ph supplied to the clock terminal of the counter 152 is used as the clock pulse, and the counter 152 performs a counting operation based thereon.

The output Q2B of the counter 152 is supplied to the monostable multivibrators 154 and 158, and these monostable multivibrators 154 and 158 are triggered at a time t1 shown in FIG. 12 when the output Q2B undergoes a transition from the low level to the high level. From the time t1, a signal Pj shown in FIG. 13(A) is obtained from the monostable multivibrator 154 and a signal Po shown in FIG. 13(F) is obtained from the monostable multivibrator 158.

The monostable multivibrator 155 is triggered by a rise in the output signal Pj of the monostable multivibrator 154 and produces a signal Pk shown in FIG. 13(B). The monostable multivibrator 156 is triggered by a fall in the output signal Pk of the monostable multivibrator 155 and produces a signal Pl shown in FIG. 13(C). The monostable multivibrator 157 is triggered by a rise in the output signal Pl of the monostable multivibrator 156 and produces a signal Pm shown in FIG. 13(D). The OR circuit 148 is supplied with the signals Pk and Pm and produces a signal Pn shown in FIG. 13(E). The exclusive-OR circuit 141 is supplied with the signals Pn and Po and produces a signal Pq shown in FIG. 13(G). The differential amplifier 153 is supplied with the signals Pn and Pq and produces the pilot signal Pp shown in FIG. 13(H). The numerical values shown below the signal waveforms in FIG. 13 are just examples of the pulse widths of the signals.

Figure 14:
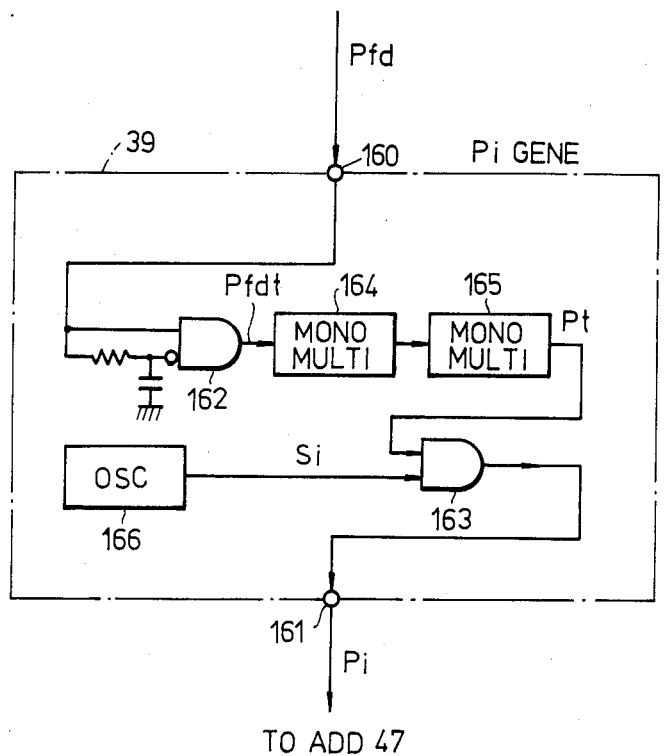
FIG. 14 is a system circuit diagram showing an embodiment of a field discriminating signal generating circuit within the block system shown in FIG. 1.

Next, in the embodiment shown in FIG. 1, the field index signal generating circuit 39 within the control circuit 15 may have the construction shown in FIG. 14. In FIG. 14, those parts which are the same as those corresponding parts in FIG. 1 are designated by the same reference numerals, and description thereof will be omitted.

In FIG. 14, the field discriminating signal Pfd is applied to an input terminal 160, and the field index signal Pi is outputted via an output terminal 161. The field index signal generating circuit 39 generally comprises AND circuits 162 and 163, monostable multivibrators 164 and 165, and an oscillator 166. The field discriminating signal Pfd applied to the field index signal generating circuit 39 and various signals generated in the field index signal generating circuit 39 are shown in the timing chart of FIG. 15.

The operation of the field index signal generating circuit 39 shown in FIG. 14 can readily be understood from the timing chart shown in FIG. 15, and only a brief description will be given on the operation of the field index signal generating circuit 39.

In FIG. 14, the AND circuit 162 generates a pulse signal Pfdt shown in FIG. 15(C) which is responsive to a rise in the field discriminating signal Pfd shown in FIG. 15(B) for discriminating the field of the composite video signal a shown in FIG. 15(A). This pulse signal Pfdt triggers the monostable multivibrator 164. The monostable multivibrator 164 produces a pulse signal having a pulse width Ta, and triggers the monostable multivibrator 165 by a fall in the pulse signal. Hence, the monostable multivibrator 165 produces a pulse signal Pt shown in FIG. 15(D) having a pulse width Tb, and this pulse signal Pt is supplied to the AND circuit 163 as a gating pulse signal. The AND circuit 163 is also supplied with an output signal Si shown in FIG. 15(E) which is produced from the oscillator 166. Hence, the AND circuit 163 extracts the signal Si with the pulse width of the pulse signal Pt, and produces the field index signal Pi shown in FIGS. 15(F) and 15(H). This field index signal Pi is outputted via the output terminal 161. FIG. 15(G) shows the composite video signal a on an expanded time base.

Next, the recording operation of the recording apparatus according to the present invention will be described by referring to FIGS. 1, 2, 5, 6, 8A, 8B, 9 and 10. When the power source to the recording apparatus is turned ON and the recording apparatus is in the recording standby mode before the time ts in FIGS. 6, 8A and 8B, the recording medium 12 is rotating at the predetermined rotation frequency with the predetermined rotational phase. The head 16 is positioned in a vicinity of the track which was last formed on the recording medium 12. It will be assumed in the description given hereunder that the nth track shown in FIG. 2A is the last track formed on the recording medium 12 and that the head 16 is positioned in a vicinity of the nth track.

In this state, the gating signal u from the terminal 29 of the control circuit 15 has a low level, and the gating circuit 48 is accordingly closed. On the other hand, since the low level gating signal u is inverted into the high level signal v in the inverter 51 and this signal v is supplied to the gating circuit 52, the gating circuit 52 is open. Hence, the reproduced signal from the head 16 is passed through the gating circuit 52 and the preamplifier 53, and is supplied to the demodulator 54 and the pilot signal detecting circuit 55. The demodulated composite video signal from the demodulator 54 is supplied to the monitoring receiver 57 via the field delay circuit 56, and the reproduced picture is obtained in the monitoring receiver 57. The pilot signal detecting circuit 55 carries out the operations described before and produces the D.C. signal m shown in FIG. 5(K) which is in correspondence with the pilot signal Pp reproduced by the head 16. This D.C. signal m is supplied to the sample and hold circuit 58.

Since it is assumed that the head 16 is in the vicinity of the nth track on the recording medium 12 in the recording standby state, the timing pulse signal g having the timing for controlling the sample and hold circuit 58 to perform the sampling and holding at the times T1, T4, ... shown in FIG. 2A is obtained from the terminal 34 of the control circuit 15. Accordingly, the sample and hold circuit 58 samples and holds the a portion of the D.C. signal m corresponding to the pilot signal Pp which is reproduced as crosstalk from the (n−1)th track which is adjacent to the nth track which is being scanned by the head 16. The sampled and held signal (voltage) from the sample and hold circuit 58 is supplied to the comparator 64 and is compared with the reference voltage Er from the reference voltage source 65, and the error signal (voltage) is produced from the comparator 64.

In the recording standby mode before the time ts, the switching control signals s and r from the respective terminals 30 and 32 of the control circuit 15 have high levels as shown in FIGS. 6(O) and 8B(M) and FIGS. 6(N) and 8B(P). For this reason, the moving contacts Sc of the switches 69 and 70 are connected to the respective contacts Sa.

The output error signal of the comparator 64 is supplied to the actuator 24 via the phase compensation circuit 68, the contacts Sa and Sc of the switch 70 and the buffer amplifier 74. The output error signal of the comparator 64 is also supplied to the feed motor 17 via the lowpass filter 66, the contacts Sa and Sc of the switch 69 and the buffer amplifier 73. Accordingly, the first and second loops described before operate so that the actual displacement of the head 16 coincides with the predetermined reference displacement, that is, so that the head 16 becomes accurately positioned on the nth track which is separated from the adjacent (n−1)th track by the predetermined track pitch and the output error signal (voltage) of the comparator 64 approaches zero. Thus, the head 16 correctly scans over the nth track on the recording medium 12 during the recording standby mode.

When the position of the head 16 is set, the predetermined setting time elapses and the head 16 becomes stationary, the switch 27a of the manipulation part 27 is manipulated at the time ts. The track shifting pulse signal Ptsw is generated within the timing pulse generating circuit 28 at the time t1 when the first field discriminating signal Pfd is obtained after the time ts. Based on this field discriminating signal Pfd, the timing pulse generating circuit 28 generates the switching control signal r which undergoes a transition from the high level to the low level at the time t1, and this switching control signal r is supplied to the switch 69 from the terminal 32. Thus, the moving contact Sc of the switch 69 is switched over and connected from the contact Sa to the contact Sb.

Therefore, the feed motor 17 stops at the time t1, and the feeding of the head 16 by the feeding mechanism is stopped. In addition, the circuit part within the timing pulse generating circuit 28 for generating the sampling pulse signal g is controlled by the track shifting pulse signal Ptsw which is generated at the time t1, and the timing of this sampling pulse signal g which is supplied to the sample and hold circuit 58 from the terminal 34 of the control circuit 15 is changed. In other words, the timing of the sampling pulse signal g is changed from the timing before the time t1 which is in accordance with the times T1, T4, ... shown in FIG. 2A so as to position the head 16 on the nth track of the recording medium 12 to a timing which is in accordance with the times T2, T5, ... shown in FIG. 2A so as to position the head 16 on the (n+1)th track. The sampling pulse signal g having this new timing is supplied to the sample and hold circuit 58 from the time t1.

As described before, when the head 16 is correctly scanning the nth track shown in FIG. 2A at the time t1 shown in FIG. 6, the reproduced signal from the head 16 includes the pilot signal Pp reproduced from the nth track and the pilot signal Pp which is reproduced as crosstalk from the adjacent (n−1)th track. That is, the reproduced pilot signal within the reproduced signal includes the pilot signal portion Sn obtained from the nth track and the pilot signal portion S(n−1) obtained from the (n−1)th track. Since the timing of the sampling pulse signal g supplied to the sample and hold circuit 58 at the time t1 from the timing for positioning the head 16 on the nth track to the timing for positioning the head 16 on the (n+1)th track, the signal which is sampled and held in the sample and hold circuit 58 after the time t1 becomes the pilot signal Pp reproduced as crosstalk from the nth track. The signal (voltage) supplied to the comparator 64 from the sample and hold circuit 58 after the time t1 becomes considerably different from the reference voltage Er, and the error signal (voltage) dependent on this difference is produced from the comparator 64.

At this point in time, the switching control signal s from the terminal 30 of the control circuit 15 has a high level, and the moving contact Sc of the switch 70 is accordingly connected to the contact Sa. The error signal from the comparator 64 is supplied to the actuator 24 via the phase compensation circuit 68, the contacts Sa and Sc of the switch 70 and the buffer amplifier 74. The first loop described before operates so that the actual displacement of the head 16 coincides with the predetermined reference displacement, that is, so that the head 16 is positioned on the (n+1)th track which is separated from the nth track by the correct predetermined track pitch and the output error signal (voltage) of the comparator 64 approaches zero. As a result, the head 16 is quickly shifted from the nth track to the (n+1)th track between the times t1 and t2 shown in FIG. 6, and the head 16 correctly scans over the (n+1)th track on the recording medium 12 after the predetermined setting elapses.

At the time t2 shown in FIGS. 6, 8A and 8B when the head 16 is correctly shifted from the nth track to the (n+1)th track and the predetermined setting time has elapsed, the switching control signal s from the terminal 30 of the control circuit 15 undergoes a transition from the high level to a low level as shown in FIGS. 6(O) and 8B(M) and the moving contact Sc of the switch 70 is accordingly switched over connected from the contact Sa to the contact Sb. In addition, the switching control signal s is inverted into a high level signal in the inverter 72 and is supplied to the sample and hold circuit 71 as a sampling pulse signal. For this reason, the output error signal of the comparator 64 at the time t2 in FIGS. 8A and 8B is passed through the lowpass filter 67 and is sampled and held in the sample and hold circuit 71. The output signal of the sample and hold circuit 71 is supplied to the actuator 24 via the buffer amplifier 74 after the time t2. Thus, the actuator 24 operates after the time t2 so as to maintain the position of the head 16 at the time t2.

At the time t2, the signal t from the terminal 31 of the control circuit 15 undergoes a transition from the low level to a high level as shown in FIGS. 6(P) and 8B(L), and the erasing signal from the erasing circuit 50 is supplied to the head 16 via the adder 49. Since the signal t has the high level for only one field from the time t2 to the time t3, the supply of the erasing signal to the head 16 is stopped at the time t3.

As shown in FIGS. 6(Q) and 8B(E), the signal u has a high level from the time t3 to the time t4. Hence, the gating circuit 48 is opened and the gating circuit 52 is closed from the time t3 to the time t4. The composite video signal having the signal format described before and having the field index signal Pi and the pilot signal Pp frequency-multiplexed thereto is supplied to the head 16 via the gating circuit 48 and the adder 49, and the signal related to the even field of the composite video signal from the time t3 to the time t4 is recorded on the intended (n+1)th track on the recording medium 12.

At the time t4 when the recording of the signal related to the even field of the composite video signal on the intended (n+1)th track is completed, the signal s from the terminal 30 of the control circuit 15 undergoes a transition from the low level to a high level, and the track shifting pulse signal Ptsw is generated within the timing pulse generating circuit 28.

Due to the transition of the signal s from the low level to the high level, the moving contact Sc of the switch 70 is switched over and connected from the contact Sb to the contact Sa. In addition, responsive to the track shifting pulse signal Ptsw, the timing of the sampling pulse signal g supplied to the sample and hold circuit 58 from the terminal 34 of the control circuit 15 is changed from that during the time interval between the times t1 and t4 in FIGS. 6, 8A and 8B. In other words, the timing is changed from the timing which is in accordance with the times T2, T5, ... shown in FIG. 2A required to correctly position the head 16 on the (n+1)th track on the recording medium 12 to the timing which is in accordance with the times T3, T6, ... required to correctly position the head 16 on the new intended (n+2)th track.

The signal which is sampled and held in the sample and hold circuit 58 after the time t4 becomes the pilot signal Pp which is reproduced by the head 16 as crosstalk from the (n+1)th track which is now the adjacent track to the new intended (n+2)th track on the recording medium 12. Hence, the output signal (voltage) of the sample and hold circuit 58 supplied to the comparator 64 after the time t4 is considerably different from the reference voltage Er from the reference voltage source 65. The comparator 64 produces the error signal dependent on the difference between the reference voltage Er and the voltage which is based on the pilot signal Pp reproduced as crosstalk from the adjacent (n+1)th track.

The output error signal of the comparator 64 is supplied to the actuator 24 via the phase compensation circuit 68, the contacts Sa and Sc of the switch 70 and the buffer amplifier 74. The first loop described before operates so that the the actual displacement of the head 16 coincides with the predetermined reference displacement, that is, so that the head 16 is positioned on the (n+2)th track which is separated from the (n+1)th track by the correct predetermined track pitch and the output error signal (voltage) of the comparator 64 approaches zero. As a result, the head 16 is quickly shifted from the (n+1)th track to the (n+2)th track between the times t4 and t5 shown in FIG. 6, and the head 16 correctly scans over the (n+2)th track on the recording medium 12 after the predetermined setting elapses.

At the time t5 shown in FIGS. 6, 8A and 8B when the head 16 is correctly shifted from the (n+1)th track to the (n+2)th track and the predetermined setting time has elapsed, the switching control signal s from the terminal 30 of the control circuit 15 undergoes a transition from the high level to a low level as shown in FIGS. 6(O) and 8B(M) and the moving contact Sc of the switch 70 is accordingly switched over connected from the contact Sa to the contact Sb. In addition, the switching control signal s is inverted into a high level signal in the inverter 72 and is supplied to the sample and hold circuit 71 as a sampling pulse signal. For this reason, the output error signal of the comparator 64 at the time t5 in FIGS. 8A and 8B is passed through the lowpass filter 67 and is sampled and held in the sample and hold circuit 71. The output signal of the sample and hold circuit 71 is supplied to the actuator 24 via the buffer amplifier 74 after the time t5. Thus, the actuator 24 operates after the time t5 so as to maintain the position of the head 16 at the time t5.

At the time t5, the signal t from the terminal 31 of the control circuit 15 undergoes a transition from the low level to a high level as shown in FIGS. 6(P) and 8B(L), and the erasing signal from the erasing circuit 50 is supplied to the head 16 via the adder 49. Since the signal t has the high level for only one field from the time t5 to the time t6, the supply of the erasing signal to the head 16 is stopped at the time t6.

As shown in FIGS. 6(Q) and 8B(E), the signal u has a high level from the time t6 to the time t7. Hence, the gating circuit 48 is opened and the gating circuit 52 is closed from the time t6 to the time t7. The composite video signal having the signal format described before and having the field index signal Pi and the pilot signal Pp frequency-multiplexed thereto is supplied to the head 16 via the gating circuit 48 and the adder 49, and the signal related to the odd field of the composite video signal from the time t6 to the time t7 is recorded on the intended (n+2)th track on the recording medium 12.

At the time t7 when the recording of the signal related to the odd field of the composite video signal on the intended (n+2)th track is completed, the signal s from the terminal 30 of the control circuit 15 undergoes a transition from the low level to a high level. Due to the transition of the signal s from the low level to the high level, the moving contact Sc of the switch 70 is switched over and connected from the contact Sb to the contact Sa.

The output error signal of the comparator 64 is supplied to the actuator 24 via the phase compensation circuit 68, the contacts Sa and Sc of the switch 70 and the buffer amplifier 74. The output error signal of the comparator 64 is also supplied to the feed motor 17 via the lowpass filter 66, the contacts Sa and Sc of the switch 69 and the buffer amplifier 73. Accordingly, the first and second loops described before operate so that the actual displacement of the head 16 coincides with the predetermined reference displacement, that is, so that the head 16 becomes accurately positioned on the (n+2)th track which is separated from the adjacent (n+1)th track by the predetermined track pitch and the output error signal (voltage) of the comparator 64 approaches zero. Thus, the head 16 correctly scans over the (n+2)th track on the recording medium 12, and the recording apparatus is in the recording standby mode ready for carrying out the next recording operation for recording signals amounting to one frame on the next track pair on the recording medium 12.

When the switch 27a of the manipulation part 27 shown in FIG. 1 is manipulated after the time t7 to carry out the next recording operation for recording signals amounting to one frame, the recording apparatus shown in FIG. 1 carries out operations similar to those described heretofore in conjunction with FIGS. 6, 8A and 8B for the time interval between the times ts and t7. Every time the switch 27a is manipulated, the head 16 records on one track pair a signal related to one even field of the composite video signal and a signal which is related to one odd field of the composite video signal and has a time difference of three fields compared to the signal related to the one even field recorded on the same track pair.

In the embodiment described heretofore, it is assumed that the rotary recording medium which is used to record the composite video signal is a cylindrical magnetic recording medium. However, the recording apparatus according to the present invention may be applied to the recording of the composite video signal on any type of rotary recording medium such as a disc, and the recording system is not limited to the magnetic recording system.

In order to obtain a still picture by reproducing the signal amounting to one frame of the composite video signal from one track pair on the rotary recording medium, the scanning element simply needs to be quickly shifted from the closed loop track which is being scanned to an adjacent closed loop track within the vertical blanking period of the composite video signal every time the scanning element completes scanning one closed loop track. Such shifting of the scanning element may easily be carried out by known means. In addition, by using the pre-recorded pilot signal as a tracking reference signal for controlling the tracking of the scanning element during the reproducing mode, it is possible to satisfactorily reproduce the signals from the rotary recording medium which is recorded with a high density.

Next, description will be given with respect to a modification of the embodiment shown in FIG. 1. In the first embodiment described before in conjunction with FIG. 1, it was assumed that the (n−1)th track shown in FIG. 2A was already formed when forming the intended nth track, for example. However, when initially starting the recording with respect to an unrecorded rotary recording medium in an initial state, there is no pre-recorded track on the rotary recording medium, and it is impossible to control the track position of the intended track which is to be formed based on the crosstalk component reproduced from an adjacent track because there is no such adjacent track. Hence, in the present modification, a switching circuit shown in FIG. 16 is provided so as to enable the recording in the initial state. FIG. 16 shows the essential part of the modification, and the illustration of other parts of the recording apparatus will be omitted because the other parts are identical to that shown in FIG. 1.

In FIG. 16, the output signal of the switch 70 shown in FIG. 1 is applied to a terminal 170 and is supplied to a fixed contact Sa of a switching circuit 171. Another fixed contact Sb of the switching circuit 171 is grounded, and a moving contact Sc of the switching circuit 171 is connected to a terminal 172. A signal from the terminal 172 is supplied to the buffer amplifier 74 shown in FIG. 1. A control signal CNTL is applied to a terminal 173. The moving contact Sc of the switching circuit 171 is connected to the contact Sb in the initial state and is connected to the contact Sa during other states responsive to the control signal CNTL. For example, this control signal CNTL may be generated within the timing pulse generating circuit 28.

FIGS. 17(A) through 17(O) show the timing charts for explaining the operation of the present modification. In FIGS. 17(A) through 17(O), those signals which correspond to the signals shown in FIGS. 1 and 6 are designated by the same reference characters, and description thereof will be omitted. At a time ta when the recording apparatus is in the initial state, the switching circuit 171 is grounded and a moving part of the actuator 24 is in a neutral (center) position. In addition, the feed motor 17 is stopped. When the switch 27a of the manipulation part 27 is manipulated in this state as shown in FIG. 17(D), an erasing operation and a recording operation are carried out in synchronism with the field discriminating signal Pfd shown in FIG. 17(B) in the state wher ethe actuator 24 and the feed motor 27 are stopped, as may be seen from FIGS. 17(H) and 17(I) which show the signals t and u, respectively. The first recording is carried out from a time tb in synchronism with a rise in the field discriminating circuit Pfd which first occurs after the switch 27a is manipulated and the erasing operation is carried out. At the same time as when this first recording operation is ended at a time tc, the moving contact Sc of the switching circuit 171 is switched over and connected from the contact Sb to the contact Sa and the track shifting pulse signal Ptsw is generated within the timing pulse generating circuit 28 as shown in FIG. 17(E). Thus, similarly as in the case described before, the head 16 is quickly shifted by one track pitch to the track position of a new intended track which is to be formed on the recording medium 12. Accordingly, the recording of signals amounting to one frame on one track pair of the recording medium 12 is completed at a time tf, by carrying out operations similar to those described before. For example, a time tg which is after the time tf corresponds to the time ts shown in FIG. 6 and the like when the recording apparatus is in the recording standby mode.

In the explanation given heretofore, it was assumed for convenience' sake that the composite video signal which is to be recorded on the rotary recording medium comprises a frequency modulated luminance signal and a frequency converted carrier chrominance signal. However, the composite video signal which is to be recorded it not limited to such and may consist of picture information of other forms. The composite video signal which is to be recorded simply needs to include at least picture information and a synchronizing signal. For example, the picture information may consist of primary color signals such as the red, green and blue primary color signals obtained from a camera or the like. In addition, the picture information may consist of a line-sequential color difference signal. Furthermore, the composite video signal may take the form of a VBS (video burst and sync) signal including picture information, burst and synchronizing signal.

Next, a brief description will be given with respect to a second embodiment of the video signal recording apparatus according to the present invention for the case where the picture information in the composite video signal which is to be recorded consists of the red, green and blue primary color signals. FIG. 18 shows the essential part of the present embodiment. In FIG. 18, those parts which correspond to the parts in FIG. 1 are designated by the same reference numerals with a subscript R, G and B for the elements in the respective systems for the red, green and blue primary color signals (hereinafter simply referred to as signals R, G and B). In the present embodiment, a head 16R records the signal R which includes a synchronizing signal within a recording region 12R on the recording medium, a head 16G records the signal G which includes a synchronizing signal within a recording region 12G on the recording medium 12, and a head 16B records the signal B which includes a synchronizing signal within a recording region 12B on the recording medium 12. Each of the heads 16R, 16G and 16B record signals amounting to one frame on one track pair within the respective recording regions 12R, 12G and 12B, as in the case of the head 12 described before. In the present embodiment, it is possible to obtain a reproduced picture having an extremely high picture quality because the three primary color signals R, G and B are recorded within independent recording regions on the recording medium 12. When recording the signals R, G and B on the recording medium 12, it is desirable to record an address code together therewith so that the corresponding track positions in each of the recording regions 12R, 12G and 12B can easily be detected during the reproducing mode.

Figure 19:
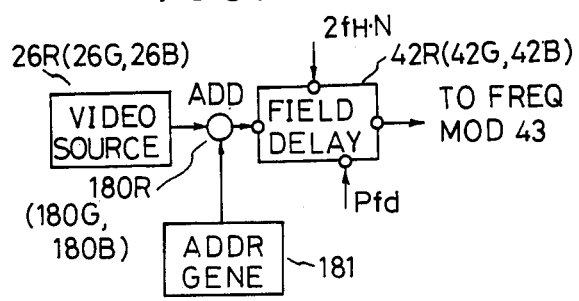
FIG. 19 is a system block diagram showing another essential part of the second embodiment.

FIG. 19 shows another essential part of the second embodiment. In FIG. 19, the signal R (or G, B) from a video signal generating source 26R (or 26G, 26B) is supplied to an adder 180R (or 180G, 180B). An address code from an address code generating circuit 181 is also supplied to the adder 180R, and the signal R added with the address code is supplied to a field delay circuit 42R (or 42G, 42B). The address code may employ a known signal format and may be extracted by known means at the time of the reproduction. Other parts of the recording apparatus are essentially the same as those of the first embodiment shown in FIG. 1, and the illustration and description thereof will be omitted.

It is also possible to record a luminance signal and a carrier chrominance signal in independent recording regions on the recording medium as in the case of the recording of the three primary color signals R, G and B.

Figure 20:
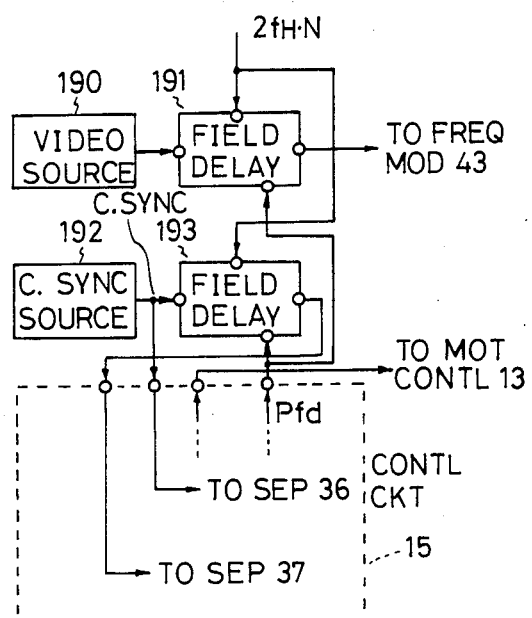
FIG. 20 is a system block diagram showing an essential part of a third embodiment of the video signal recording apparatus according to the present invention.

In the description given heretofore, the recording apparatus is supplied with the input composite video signal including the video information and the synchronizing signal from the single composite video signal generating source 26. However, the video information and the synchronizing signal may be obtained independently from independent signal sources. FIG. 20 shows an essential part of a third embodiment of the video signal recording apparatus according to the present invention for the case where a video signal and a composite synchronizing signal are obtained from independent signal sources. A video signal from a video signal generating source 190 including no synchronizing signal is supplied to the frequency modulator 43 shown in FIG. 1 via a field delay circuit 191 having the same construction as the field delay circuit 42 shown in FIG. 1. On the other hand, a composite synchronizing signal from a composite synchronizing signal generating source 192 and a composite synchronizing signal outputted from a field delay circuit 193 having the same construction as the field delay circuit 42 shown in FIG. 1 are supplied to the respective separating circuits 36 and 37 within the control circuit 15 shown in FIG. 1. The field discriminating signal Pfd from the control circuit 15 is supplied to terminals of the field delay circuits 191 and 193 corresponding to the terminal 42d of the field delay circuit 42. In addition, a signal having a frequency of $2f_H \cdot N$ is supplied to terminals of the field delay circuits 191 and 193 corresponding to the terminal 42c of the field delay circuit 42 shown in FIG. 1. Other parts of the recording apparatus are essentially the same as the recording apparatus shown in FIG. 1, and the illustration and description thereof will be omitted.

Figure 21:
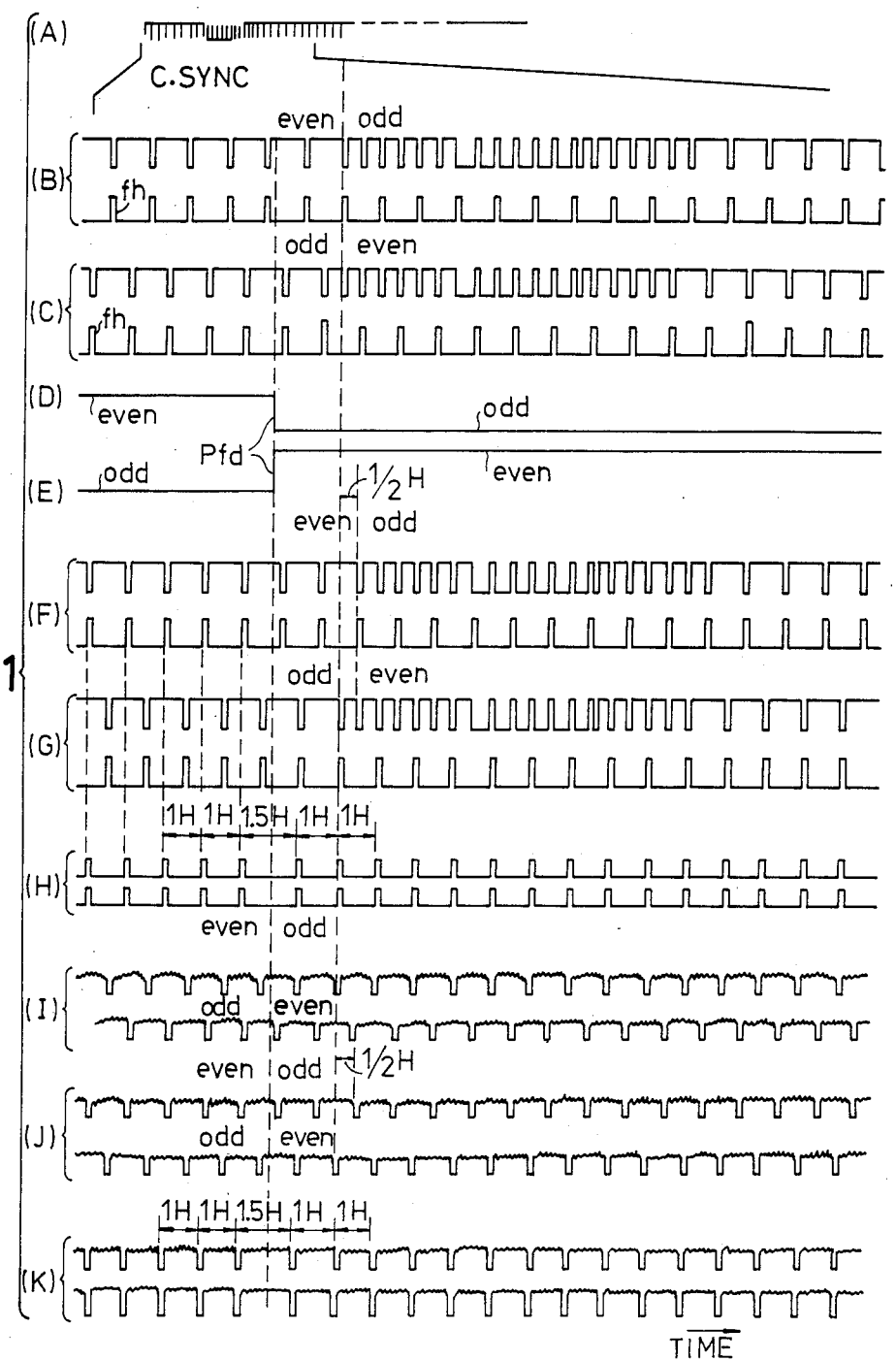
FIGS. 21(A) through 21(K) are timing charts for explaining the operation of the block system shown in FIG. 20.

FIG. 21(A) shows the composite synchronizing signal C.SYNC from the composite synchronizing signal generating source 192, and FIGS. 21(B) and 21(C) respectively show the changing portions of the composite synchronizing signal C.SYNC shown in FIG. 21(A) where the field changes from the even field to the odd field and changes from the odd field to the even field, with the time base expanded compared to FIG. 21(A). FIGS. 21(D) and 21(E) show the field discriminating signal Pfd in correspondence with FIGS. 21(B) and 21(C), and FIGS. 21(F) and 21(G) respectively show the delayed composite synchronizing signal which has been delayed in the CCD within the field delay circuit 193 in correspondence with FIGS. 21(B) and 21(C). FIGS. 21(I) and 21(J) respectively show the video signal from the video signal generating source 190 and the video signal which has been delayed in the CCD within the field delay circuit 191, in correspondence with FIGS. 21(B) and 21(C). FIG. 21(K) shows the output video signal of the field delay circuit 191 in correspondence with FIGS. 21(B) and 21(C). In FIGS. 21(B), 21(C), 21(F) and 21(G), two waveforms are shown in parallel, and the lower waveform shows the horizontal synchronizing signal portion.

When recording only the picture information such as the primary color signals on the rotary recording medium, it is possible to record a pilot signal which may be used instead of the synchronizing signal. By recording such a pilot signal together with the picture information on the rotary recording medium, it is possible to synchronize the reproduced video information at the time of the reproduction based on the reproduced pilot signals.

Further, the present invention is not limited to these embodiments, but various variations and modifications may be made without departing from the scope of the present invention.

What is claimed is:

1. A video signal recording apparatus for recording an input composite video signal which is to be recorded on closed loop tracks which are successively formed on a rotary recording medium, said input composite video signal including at least picture information and a synchronizing signal, said video signal recording apparatus comprising:

recording and reproducing means for recording and reproducing the input composite video signal on and from the rotary recording medium which undergoes one revolution in one field of the input composite video signal, said input composite video signal using horizontal and vertical scan in conformance with a 2:1 interlaced scanning;

feeding means for intermittently feeding said recording and reproducing means;

driving circuit means for supplying a driving signal for driving and controlling said feeding means;

gating means for passing and supplying to said recording and reproducing means as an output signal of said gating means said input composite video signal in a recording mode, and for passing and supplying as an output signal of said gating means a reproduced signal which is reproduced from the rotary recording medium by said recording and reproducing means in a reproducing mode;

track position detecting means for obtaining an actual track pitch between an intended track which is to be newly formed on the rotary recording medium and an adjacent pre-recorded track adjacent to the intended track when said recording and reproducing means is scanning the intended track based on a signal component which is reproduced as crosstalk from the adjacent pre-recorded track and for supplying to said driving circuit means an error signal which is obtained by comparing the actual track pitch and a predetermined track pitch; and control means for controlling operating timings of said gating means and said driving circuit means, said control means generating control signals based on said input composite video signal and supplying the control signals to said gating means and said driving circuit means to record a signal amounting to one field on each track of the rotary recording medium so that out of two mutually adjacent tracks making up a track pair, a signal related to one of odd and even fields out of signals which are related to two consecutive fields and constitute a picture is recorded on one track of the track pair and a signal related to another of even and odd fields out of signals which are related to two consecutive fields and constitute a picture is recorded on another track of the track pair to thereby record signals amounting to one frame on the track pair, the two signals recorded on the track pair having a time difference of M fields which is three or more odd integral multiple of one field.

2. A video signal recording apparatus as claimed in claim 1 which further comprises an erasing circuit for supplying an erasing signal to said recording and reproducing means responsive to a control signal from said control means, said recording and reproducing means erasing pre-recorded signals on a track of the rotary recording medium in an erasing mode for at least one field before a signal is recorded on each track of the rotary recording medium.

3. A video signal recording apparatus as claimed in claim 2 in which said control means generates such control signals when recording the signals on the track pair that said recording and reproducing means is fed for one track pitch by said feeding means from a pre-recorded track and the mode is set to the reproducing mode so that the reproduced signal from said recording and reproducing means is passed through said gating means during a first time period amounting to at least one field, the mode is set to the erasing mode and said recording and reproducing means erases the pre-recorded signals on the track of the rotary recording medium responsive to the output erasing signal of said erasing circuit during a second time period which is after said first time period and amounts to at least one field, the mode is set to the recording mode and said recording and reproducing means records said input composite video signal passed through said gating means during a third time period which is after said second time period and amounts to one field, said recording and reproducing means is fed for one track pitch by said feeding means and the mode is set to the reproducing mode so that the reproduced signal from said recording and reproducing means is passed through said gating means during a fourth time period which is after said third time period and amounts to at least one field, the mode is set to the erasing mode and said recording and reproducing means erases the pre-recorded signals on the track of the rotary recording medium responsive to the output erasing signal of said erasing circuit during a fifth time period which is after said fourth time period and amounts to at least one field, the mode is set to the recording mode and said recording and reproducing means records said input composite video signal passed through said gating means during a sixth time period which is after said fifth time period and amounts to one field.

4. A video signal recording apparatus as claimed in claim 3 in which said first through sixth time periods are sequential time periods.

5. A video signal recording apparatus as claimed in claim 3 in which a time interval between starting points of said third and sixth time periods amounts to M fields.

6. A video signal recording apparatus as claimed in claim 3 in which said feeding means comprises an actuator for displacing said recording and reproducing means and a motor for displacing said recording and reproducing means by displacing a carriage having said actuator provided thereon, said control means supplying to said driving circuit means a control signal for displacing said recording and reproducing means by said actuator for one track pitch immediately after said third and sixth time periods.

7. A video signal recording apparatus as claimed in claim 6 in which said control means supplies to said driving circuit means a control signal for controlling said motor to feed said carriage for two track pitches immediately after said sixth time period so that a moving part of said actuator is put into a neutral position.

8. A video signal recording apparatus as claimed in claim 1 in which said odd integer M has a constant value for the recording of the input composite video signal on any one of track pairs on the rotary recording medium.

9. A video signal recording apparatus as claimed in claim 1 in which said odd integer M has a value which is varied for the recording of the input composite video signal on each one of track pairs on the rotary recording medium.

10. A video signal recording apparatus as claimed in claim 1 in which said control means controls said gating means and said driving circuit means so that signals related to odd and even fields are recorded in a certain one track pair on the rotary recording medium and signals related to even and odd fields are recorded on another track pair on the rotary recording medium.

11. A video signal recording apparatus as claimed in claim 1 which further comprises adding means for adding a pilot signal to said input composite video signal before the input composite video signal is supplied to said gating means, said track position detecting means obtaining the actual track pitch between said intended track and said adjacent pre-recorded track based on the pilot signal which is reproduced as crosstalk from the adjacent pre-recorded track by said recording and reproducing means.

12. A video signal recording apparatus as claimed in claim 11 in which said adding means adds the pilot signal within horizontal blanking periods with an interval of a predetermined number of horizontal scanning periods so that recorded positions of the pilot signal are in non-alignment among adjacent tracks in a feeding direction of said recording and reproducing means.

13. A video signal recording apparatus as claimed in claim 12 in which said predetermined number of horizontal scanning periods is equal to three horizontal scanning periods so that the recorded position of the pilot signal in one track is deviated by one horizontal scanning period in a scanning direction of said recording and reproducing means compared to the recorded position of the pilot signal in a track adjacent thereto.

14. A video signal recording apparatus as claimed in claim 12 in which said track position detecting means comprises means responsive to a control signal from said control means for separating the pilot signal from the reproduced signal obtained from said recording and reproducing means, and sampling means responsive to a control signal from said control means for sampling the separated pilot signal to extract only a pilot signal component which is reproduced as crosstalk from the adjacent track which is adjacent to the intended track which is being scanned by said recording and reproducing means so as to obtain said actual track pitch based on the extracted pilot signal component.

15. A video signal recording apparatus as claimed in claim 11 in which said adding means further adds to the input composite video signal a field index signal for discriminating whether a signal relates to an odd field or to an even field.

16. A video signal recording apparatus as claimed in claim 1 which further comprises field delay means for passing the input composite video signal as it is during one of odd and even fields and for delaying the input composite video signal by one-half the horizontal scanning period during another of the odd and even fields.

17. A video signal recording apparatus as claimed in claim 16 which further comprises adding means for adding a pilot signal to the output composite video signal of said field delay means before the composite video signal is supplied to said gating means, said track position detecting means obtaining the actual track pitch between said intended track and said adjacent pre-recorded track based on the pilot signal which is reproduced as crosstalk from the adjacent pre-recorded track by said recording and reproducing means, said adding means adding the pilot signal within horizontal blanking periods with an interval of three horizontal scanning periods so that recorded positions of the pilot signal are in non-alignment among adjacent tracks in a feeding direction of said recording and reproducing means and the recorded position of the pilot signal in one track is deviated by one horizontal scanning period in a scanning direction of said recording and reproducing means compared to the recorded position of the pilot signal in a track adjacent thereto.

18. A video signal recording apparatus as claimed in claim 1 in which said input composite video signal comprises as the picture information a frequency modulated luminance signal and a frequency converted carrier chrominance signal which has been frequency-converted into a frequency band lower than a frequency band of the frequency modulated luminance signal.

19. A video signal recording apparatus as claimed in claim 1 in which said input composite video signal comprises as the picture information three primary color signals.

20. A video signal recording apparatus as claimed in claim 19 in which said recording and reproducing means comprises three recording and reproducing elements for independently recording the three primary color signals on independent tracks of the rotary recording medium.

21. A video signal recording apparatus as claimed in claim 1 which further comprises circuit means for supplying a signal to said feeding means to make said feeding means inoperative in an initial state where a recording is to be started with respect to an unrecorded rotary recording medium so that said recording and reproducing means is maintained stationary when carrying out a recording with respect to a first track.

22. A video signal recording apparatus as claimed in claim 21 in which said circuit means comprises a switching circuit provided on an output side of said driving circuit means, said switching circuit having a first contact supplied with the output driving signal of said driving circuit means, a second contact which is grounded and a moving contact which is coupled to said feeding means, said moving contact of said switching circuit being connected to said second contact only during said initial state and being connected to said first contact during other states.

23. A video signal recording apparatus for recording an input video signal which is to be recorded on closed loop tracks which are successively formed on a rotary recording medium, said video signal recording apparatus being also supplied with a synchronizing signal which is obtained independently of said input video signal, said video signal recording apparatus comprising:

recording and reproducing means for recording and reproducing the input video signal on and from the rotary recording medium which undergoes one revolution in one field of the input video signal, said input video signal using horizontal and vertical scan in conformance with a 2:1 interlaced scanning;

feeding means for intermittently feeding said recording and reproducing means;

driving circuit means for supplying a driving signal for driving and controlling said feeding means;

gating means for passing and supplying to said recording and reproducing means as an output signal of said gating means said input video signal in a recording mode, and for passing and supplying as an output signal of said gating means a reproduced signal which is reproduced from the rotary recording medium by said recording and reproducing means in a reproducing mode;

track position detecting means for obtaining an actual track pitch between an intended track which is to be newly formed on the rotary recording medium and an adjacent pre-recorded track adjacent to the intended track when said recording and reproducing means is scanning the intended track based on a signal component which is reproduced as crosstalk from the adjacent pre-recorded track and for supplying to said driving circuit means an error signal which is obtained by comparing the actual track pitch and a predetermined track pitch; and control means for controlling operating timings of said gating means and said driving circuit means, said control means generating control signals based on said synchronizing signal and supplying the control signals to said gating means and said driving circuit means to record a signal amounting to one field on each track of the rotary recording medium so that out of two mutually adjacent tracks making up a track pair, a signal related to one of odd and even fields out of signals which are related to two consecutive fields and constitute a picture is recorded on one track of the track pair and a signal related to another of even and odd fields out of signals which are related to two consecutive fields and constitute a picture is recorded on another track of the track pair to thereby record signals amounting to one frame on the track pair, the two signals recorded on the track pair having a time difference of M fields which is three or more odd integral multiple of one field.

* * * * *